United States Patent
Brailovskiy et al.

(10) Patent No.: US 10,419,666 B1
(45) Date of Patent: Sep. 17, 2019

(54) MULTIPLE CAMERA PANORAMIC IMAGES

(71) Applicant: Amazon Technologies, Inc., Seattle, WA (US)

(72) Inventors: Ilya Vladimirovich Brailovskiy, Mountain View, CA (US); Ilia Vitsnudel, Even Yehuda (IL); Paul Berenberg, Los Altos, CA (US); Noam Sorek, Zichron Yaccov (IL)

(73) Assignee: Amazon Technologies, Inc., Seattle, WA (US)

( * ) Notice: Subject to any disclaimer, the term of this patent is extended or adjusted under 35 U.S.C. 154(b) by 496 days.

(21) Appl. No.: 14/982,736

(22) Filed: Dec. 29, 2015

(51) Int. Cl.
| | |
|---|---|
| *H04N 5/232* | (2006.01) |
| *G06K 9/32* | (2006.01) |
| *G06K 9/20* | (2006.01) |
| *G06T 3/40* | (2006.01) |
| *G06T 7/00* | (2017.01) |

(52) U.S. Cl.
CPC .......... *H04N 5/23238* (2013.01); *G06K 9/32* (2013.01); *G06T 3/4038* (2013.01); *G06T 7/0024* (2013.01); *G06K 2009/2045* (2013.01); *G06T 2200/32* (2013.01)

(58) Field of Classification Search
CPC .............. G06K 2009/2045; G06K 9/32; G06T 2200/32; G06T 7/0024; G06T 3/4038; H04N 5/23238
See application file for complete search history.

(56) References Cited

U.S. PATENT DOCUMENTS

| | | | | |
|---|---|---|---|---|
| 7,880,807 | B2 * | 2/2011 | Gupta | G03B 17/02 348/239 |
| 8,300,084 | B2 * | 10/2012 | Li | G06T 3/4038 348/36 |
| 8,805,091 | B1 * | 8/2014 | Hensel | G06T 3/4038 345/629 |
| 9,204,041 | B1 * | 12/2015 | Campbell | H04N 13/0239 |
| 9,620,168 | B1 * | 4/2017 | Townsend | G11B 27/02 |
| 9,854,165 | B2 * | 12/2017 | Wang | H04N 5/23238 |
| 2005/0207487 | A1 * | 9/2005 | Monroe | G08B 13/19628 375/240.01 |
| 2006/0050152 | A1 * | 3/2006 | Rai | H04N 5/23238 348/218.1 |
| 2009/0290033 | A1 * | 11/2009 | Jones | G08B 13/19693 348/218.1 |

(Continued)

*Primary Examiner* — Anner N Holder
(74) *Attorney, Agent, or Firm* — Pierce Atwood LLP

(57) ABSTRACT

Devices, systems and methods are disclosed for generating stitched video data by combining video data from multiple image capture devices. For example, video data from a first image capture device and a second image capture device located near the first image capture device may be combined to generate unique panoramas. The system may determine transitions between the video data based on a focus distance to improve the stitched video data. The system may remove individual objects from first video data by substituting corresponding portions of second image data. The system may determine depth information associated with a first object represented in the video data and may add additional objects in front of or behind the first object, properly scaling and masking the additional object. The system may generate a virtual environment by weighting images from individual image capture devices and the virtual environment may be three dimensional.

20 Claims, 23 Drawing Sheets

(56) References Cited

U.S. PATENT DOCUMENTS

| | | | | |
|---|---|---|---|---|
| 2010/0097443 A1* | 4/2010 | Lablans | ................ | G03B 37/00 |
| | | | | 348/36 |
| 2010/0097444 A1* | 4/2010 | Lablans | ................ | G03B 35/00 |
| | | | | 348/46 |
| 2010/0111408 A1* | 5/2010 | Matsuhira | ............ | G06T 3/4038 |
| | | | | 382/164 |
| 2010/0182396 A1* | 7/2010 | Kroepfl | .................. | G01S 19/14 |
| | | | | 348/36 |
| 2011/0069148 A1* | 3/2011 | Jones | .................... | H04N 5/232 |
| | | | | 348/36 |
| 2011/0091065 A1* | 4/2011 | Chandrashekar | .... | G06K 9/4671 |
| | | | | 382/100 |
| 2011/0234807 A1* | 9/2011 | Jones | .............. | G08B 13/19641 |
| | | | | 348/159 |
| 2012/0293607 A1* | 11/2012 | Bhogal | ................ | G06T 3/4038 |
| | | | | 348/36 |
| 2012/0307000 A1* | 12/2012 | Doepke | ................ | G06T 3/0068 |
| | | | | 348/36 |
| 2015/0156416 A1* | 6/2015 | Filip | ................ | H04N 5/23238 |
| | | | | 348/36 |
| 2015/0358612 A1* | 12/2015 | Sandrew | ............ | H04N 13/0257 |
| | | | | 348/36 |

* cited by examiner

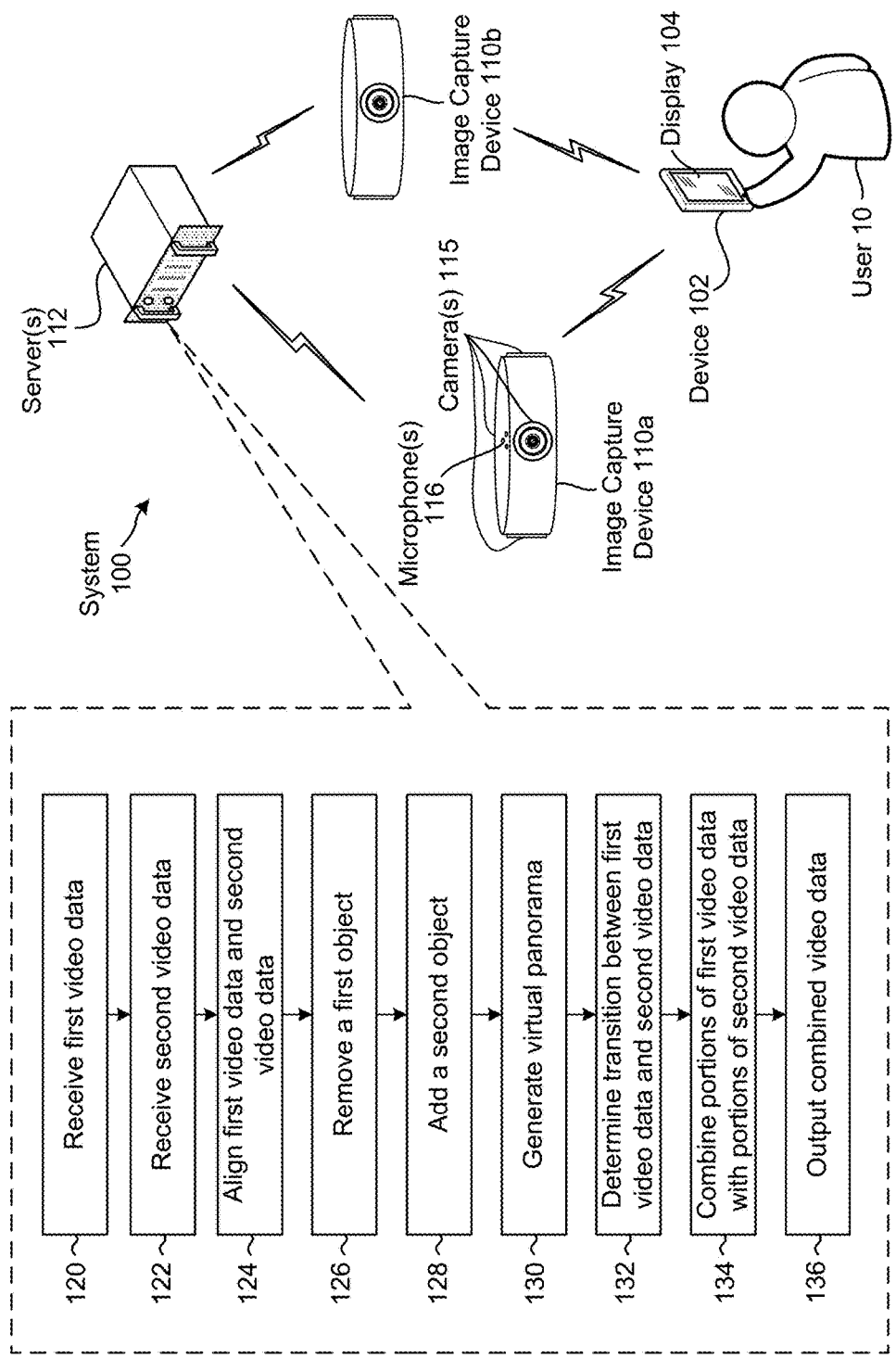

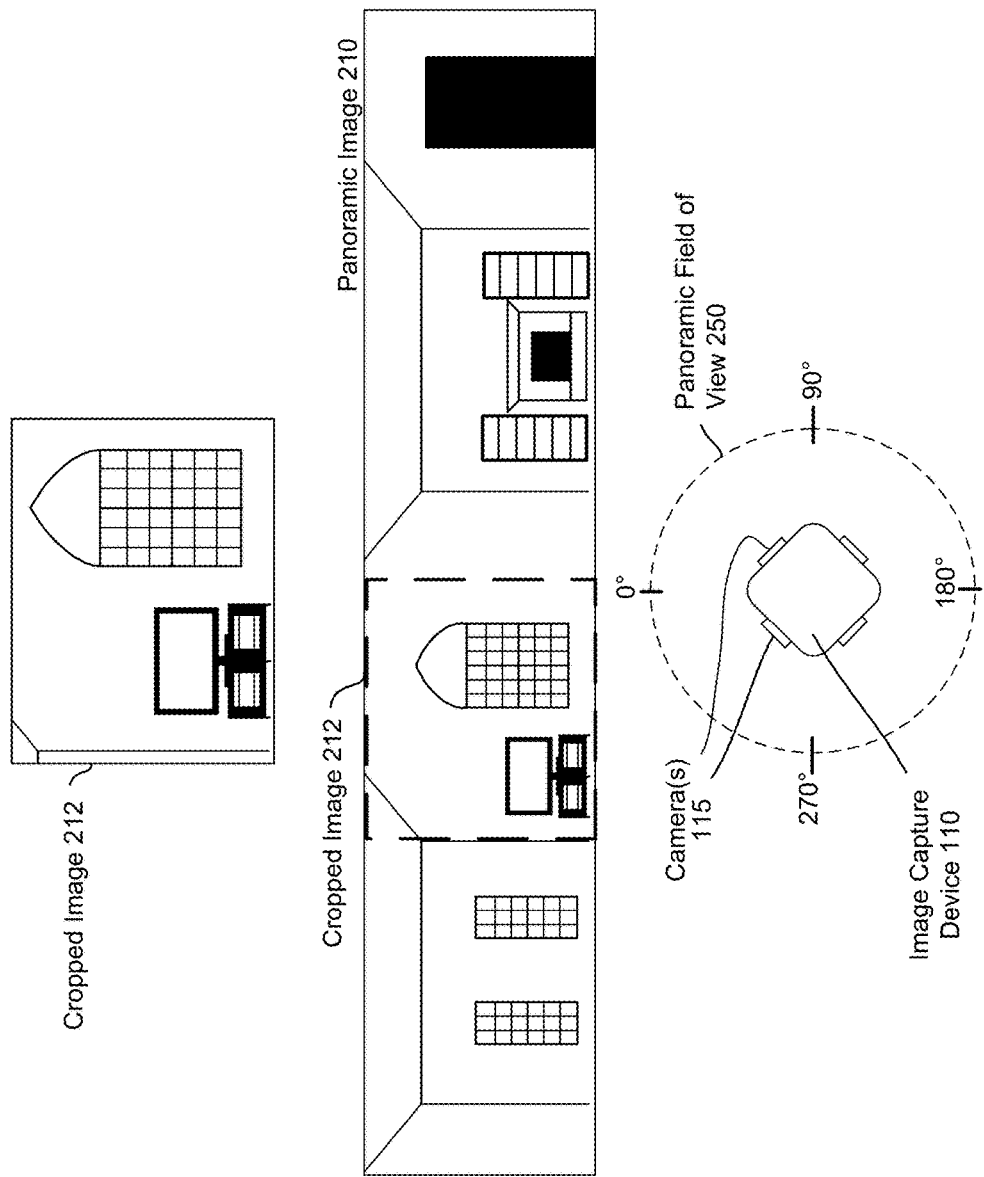

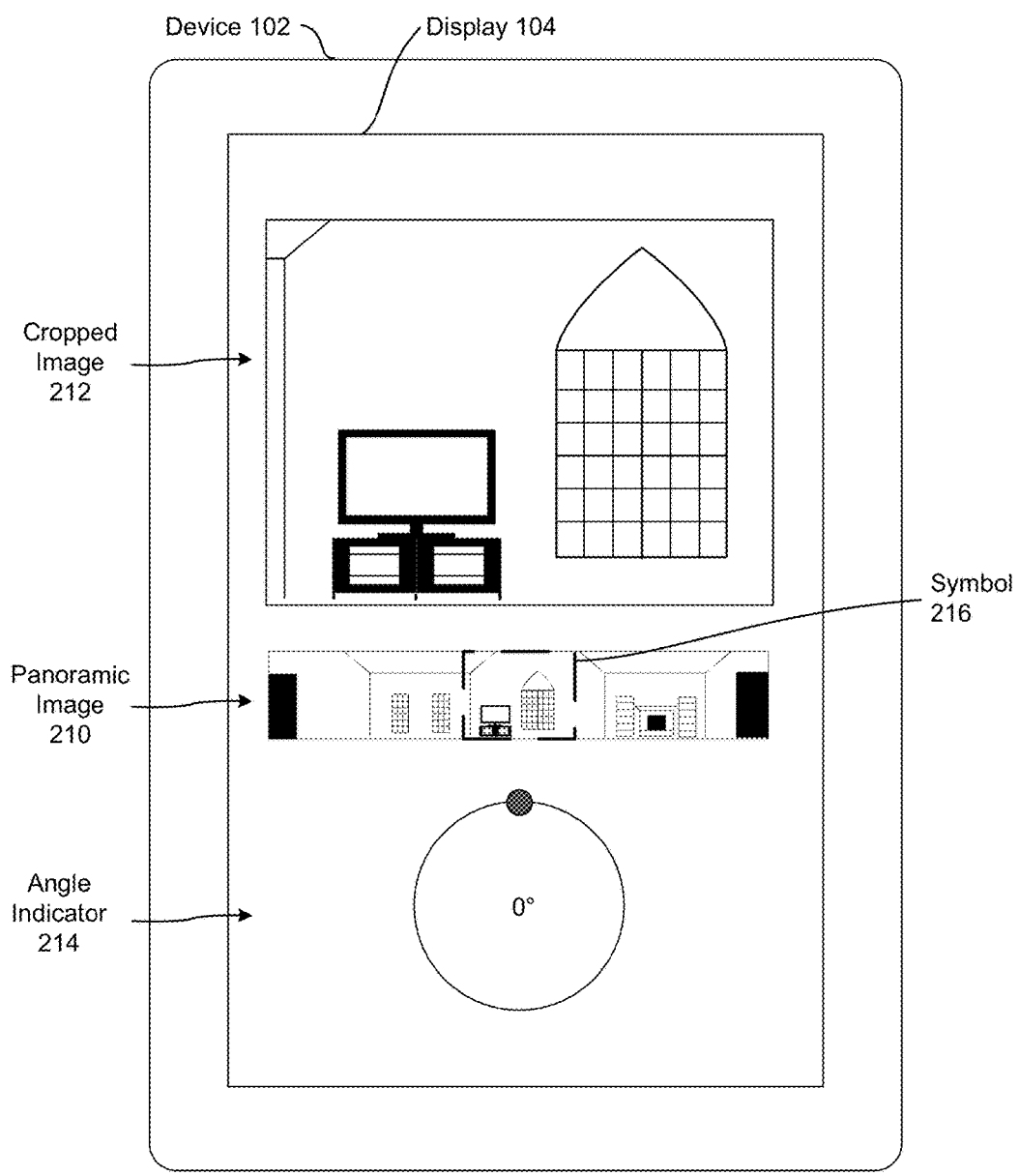

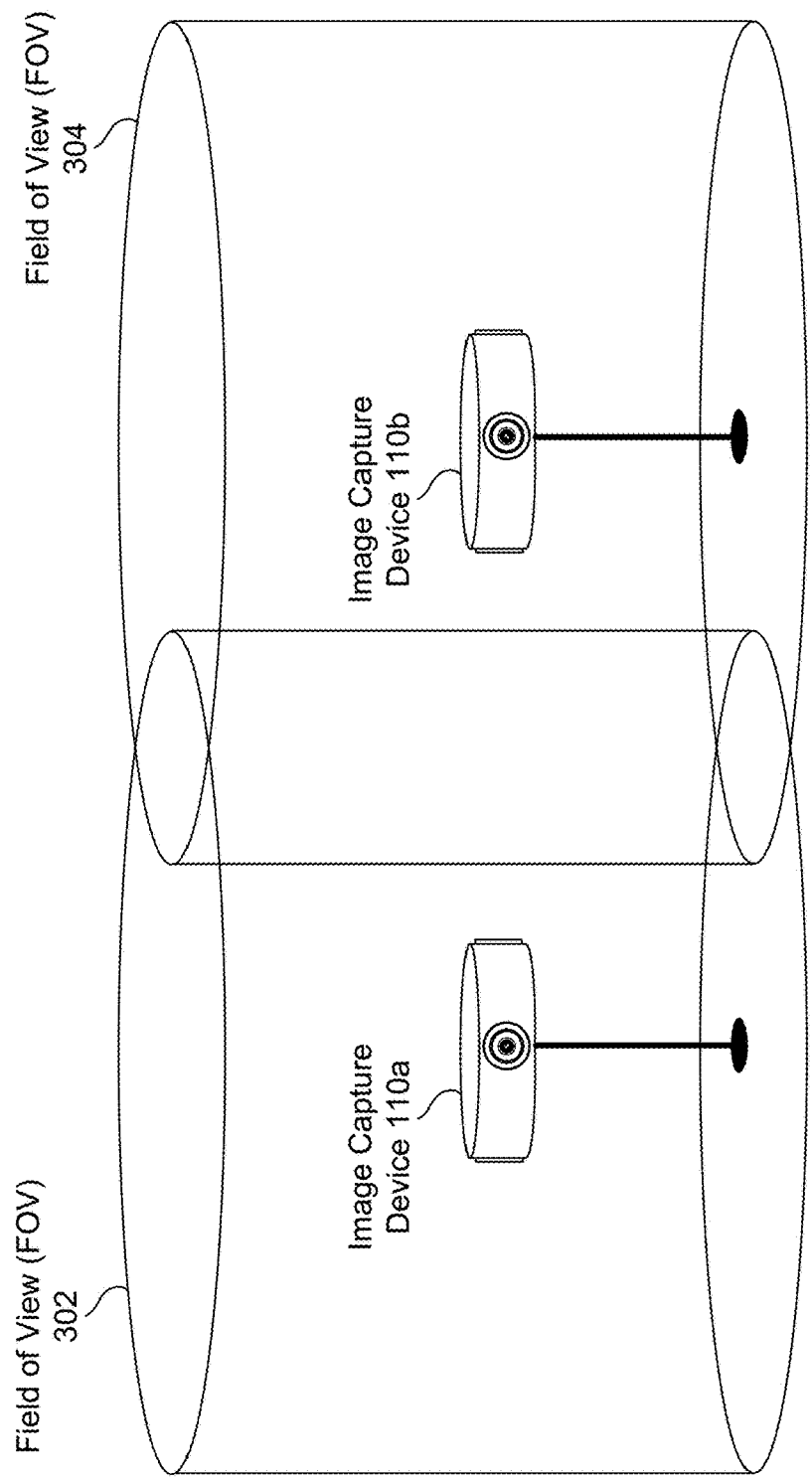

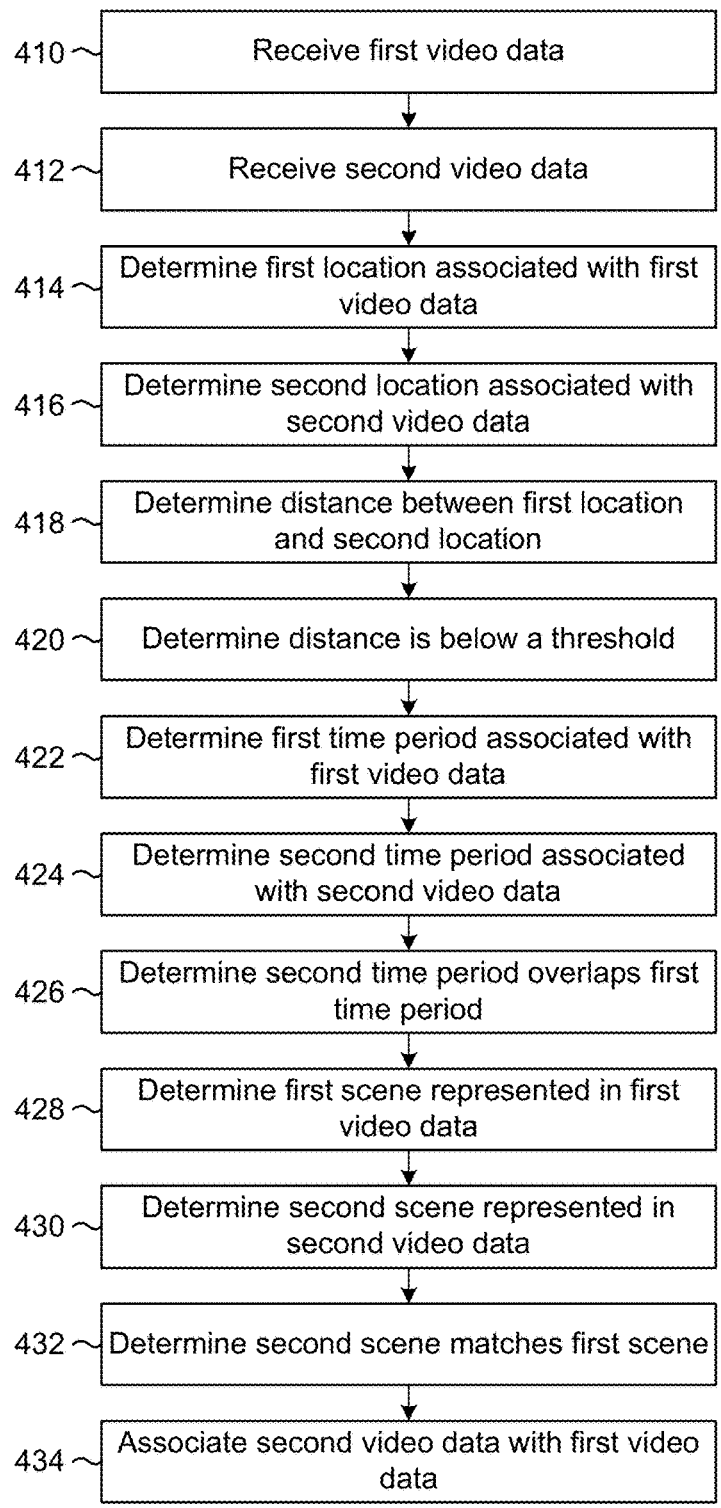

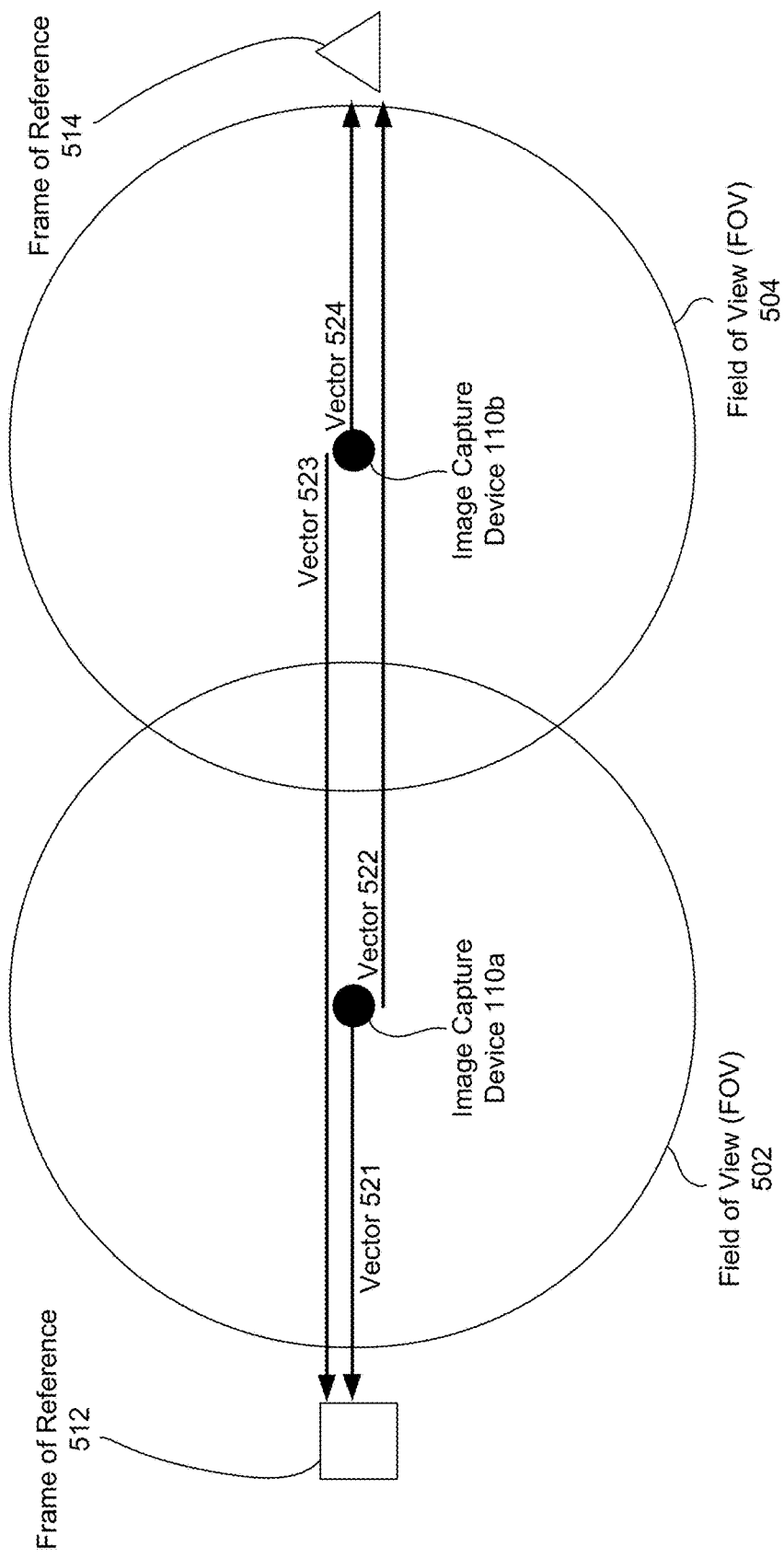

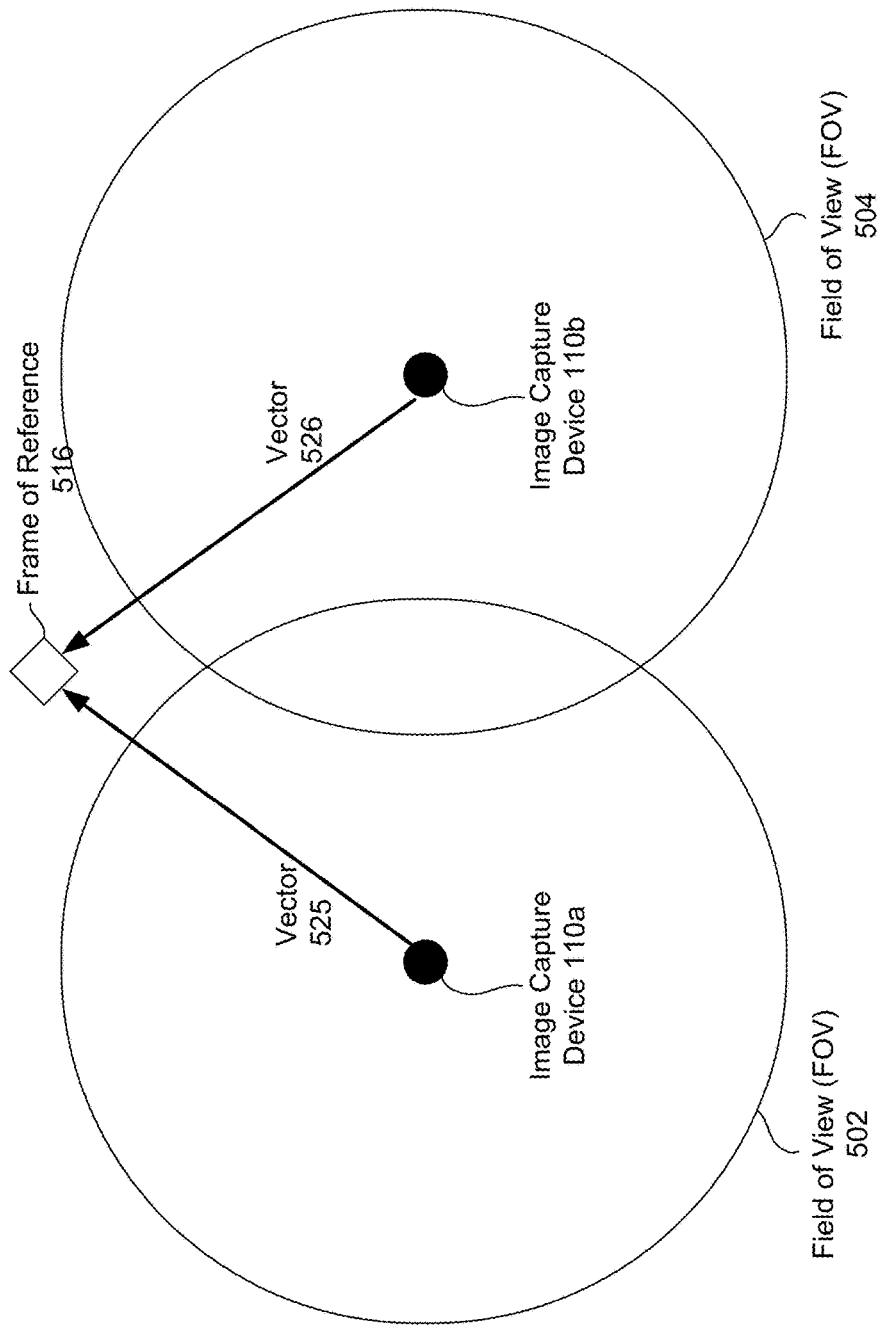

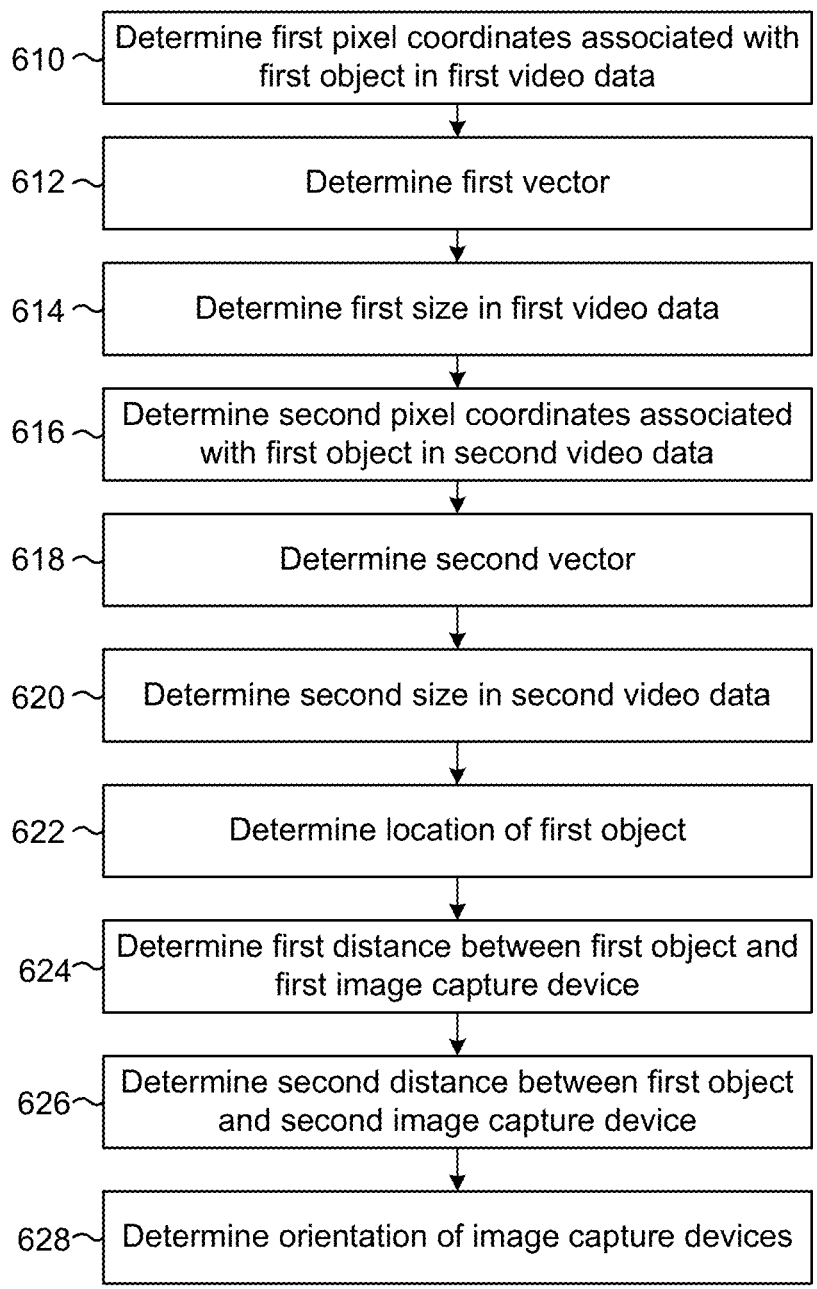

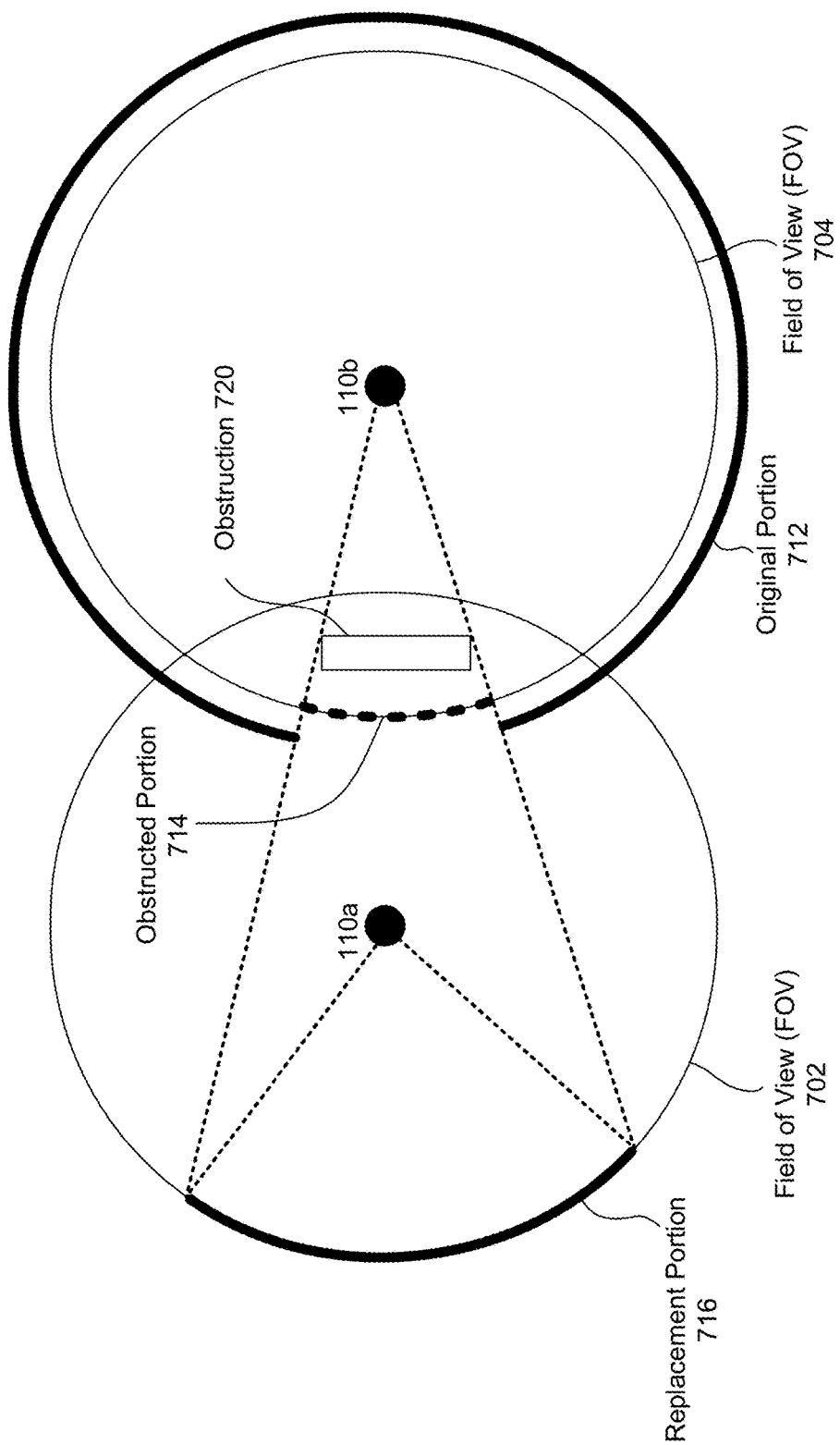

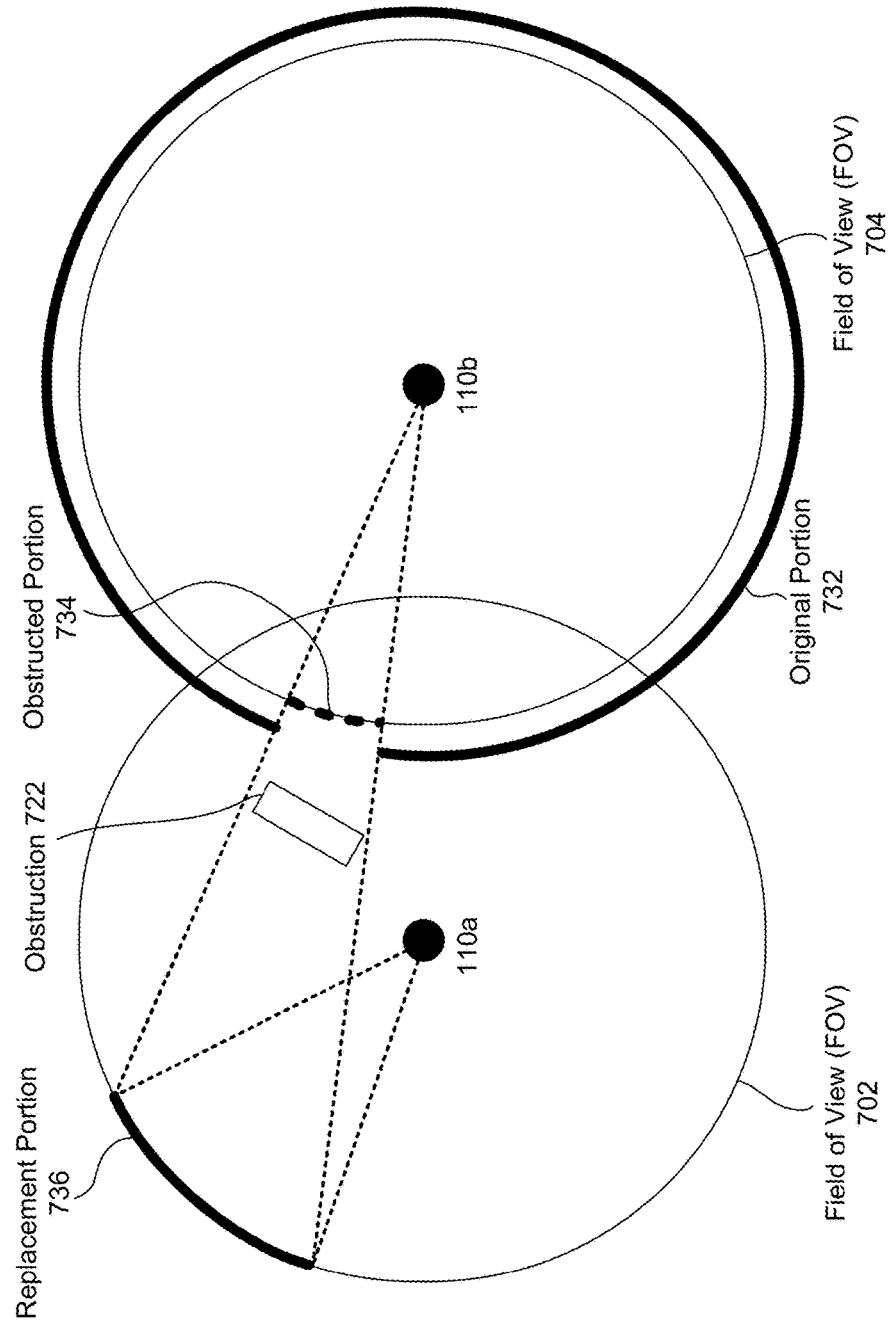

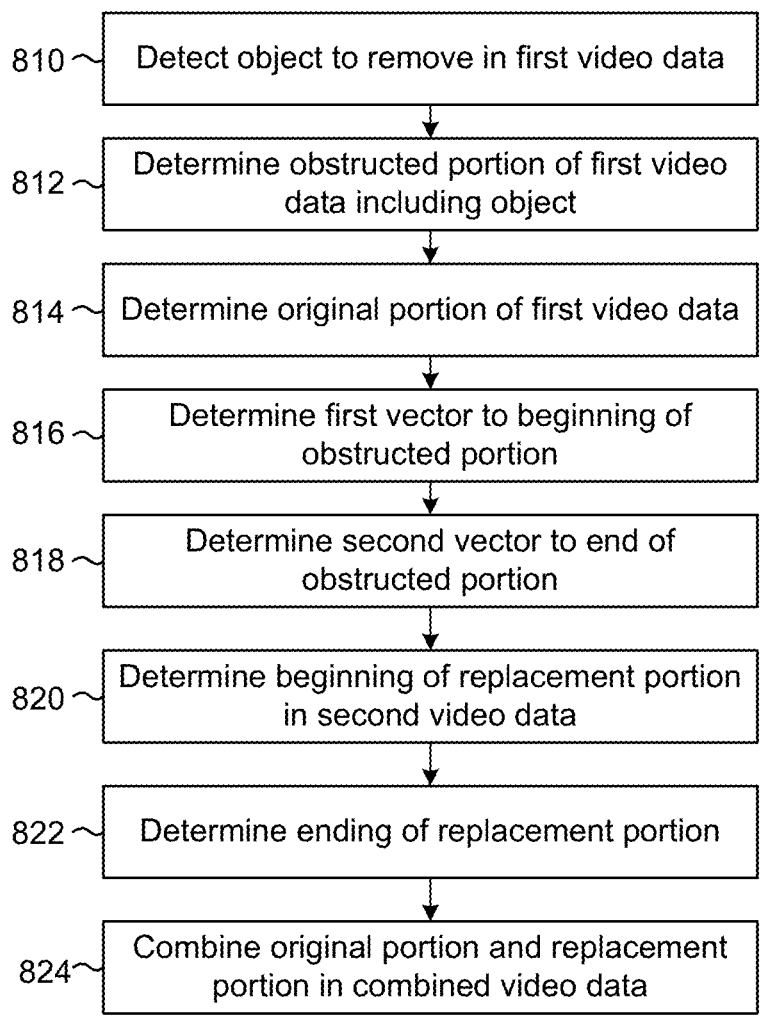

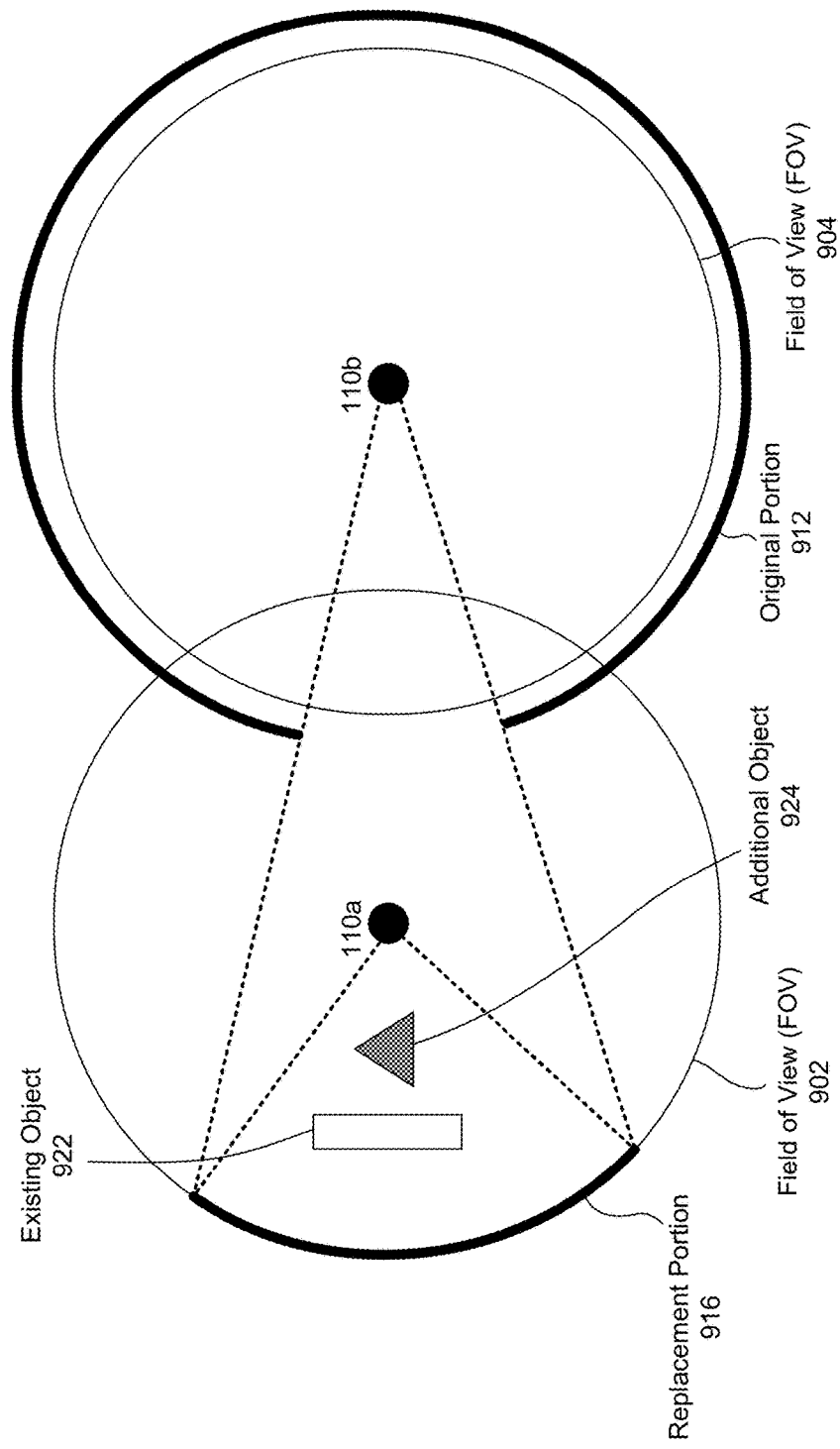

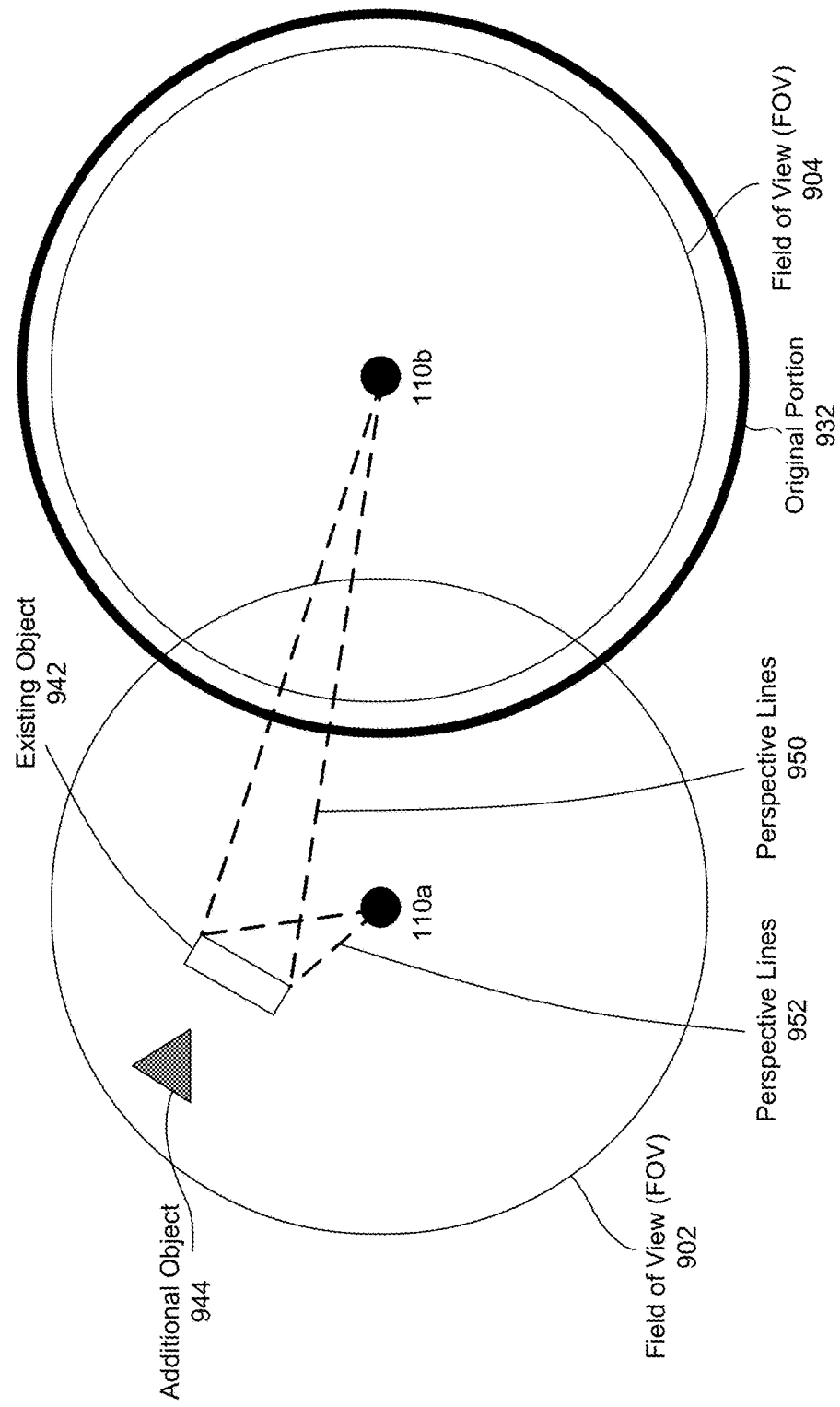

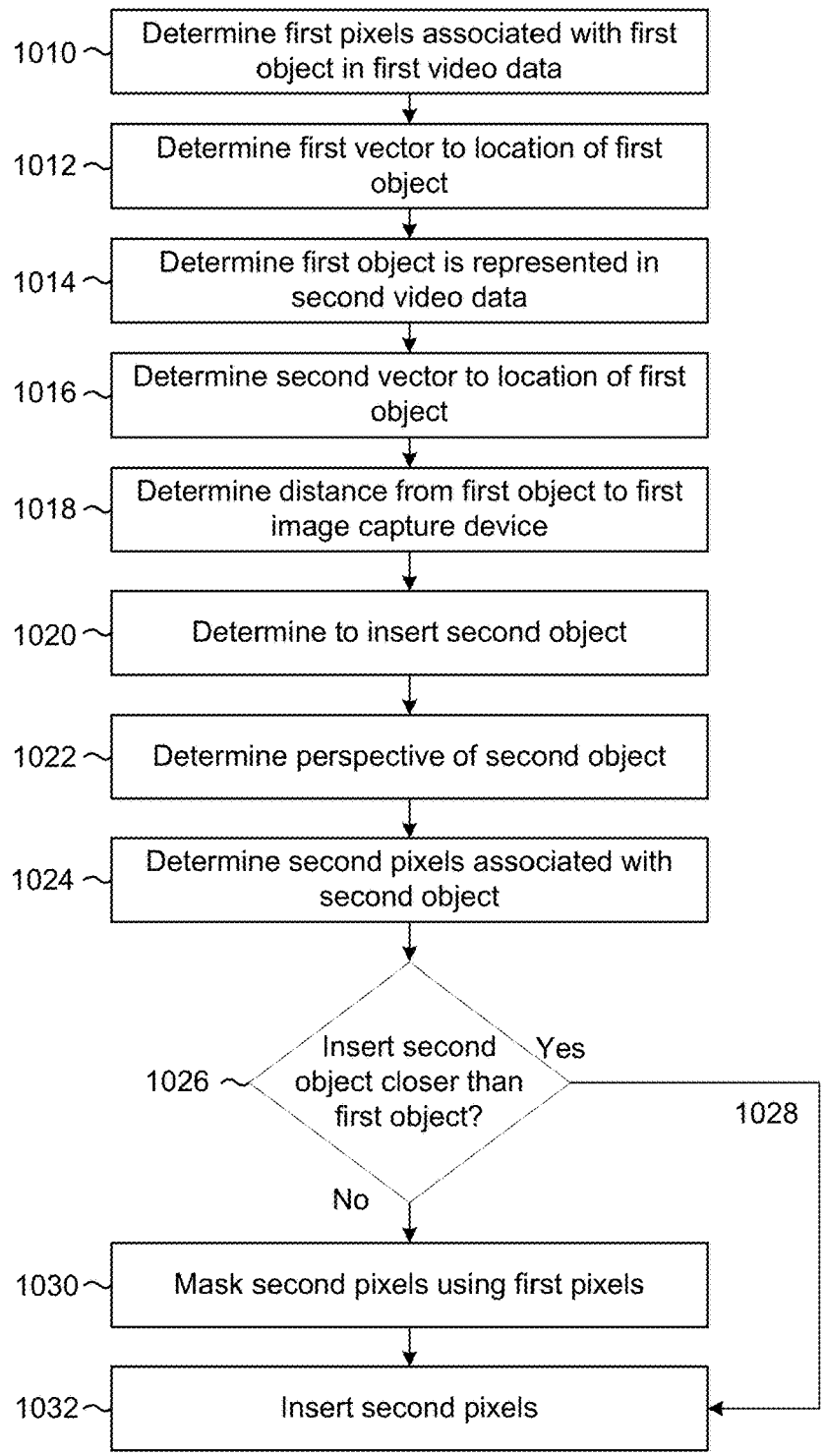

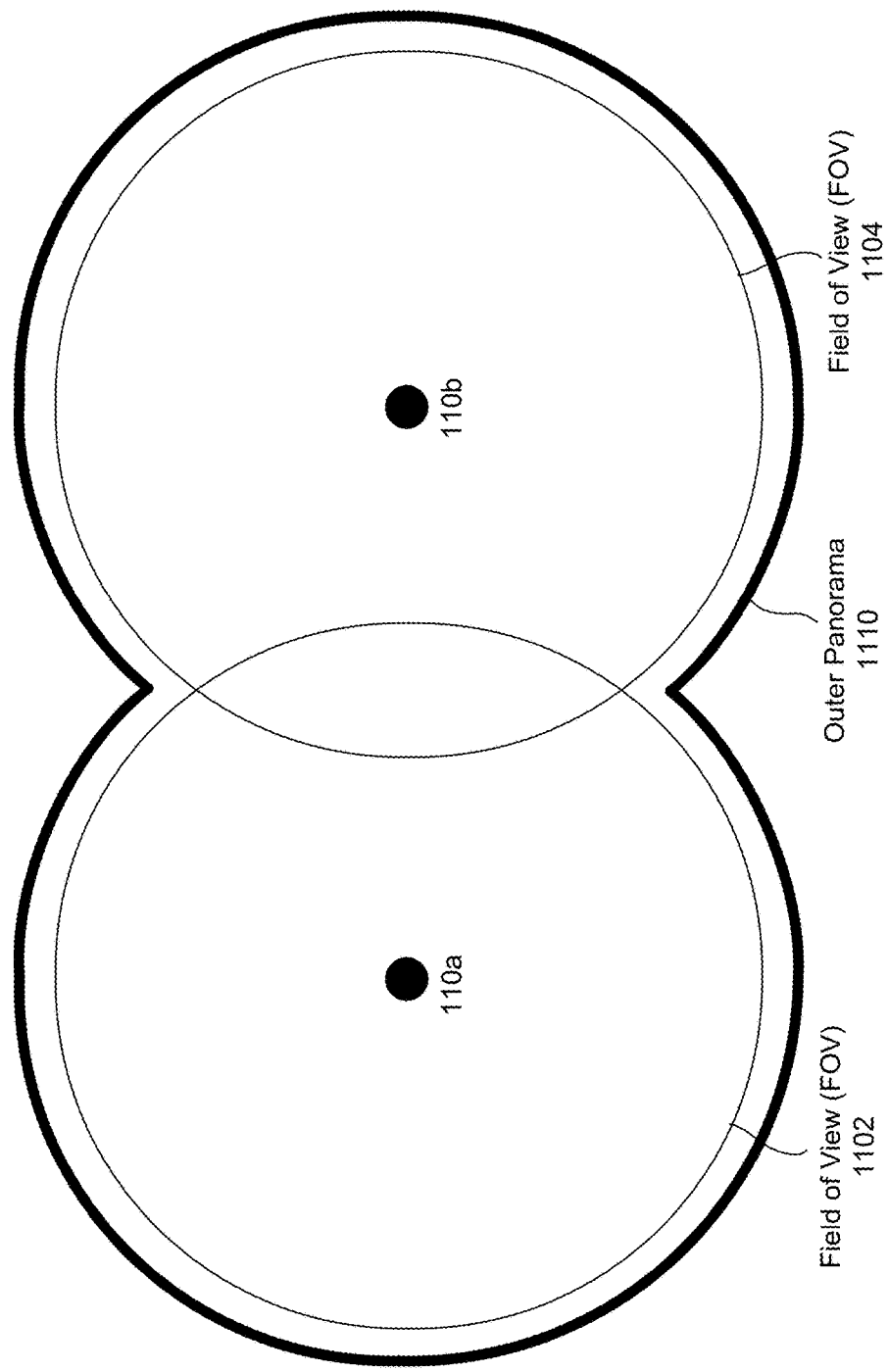

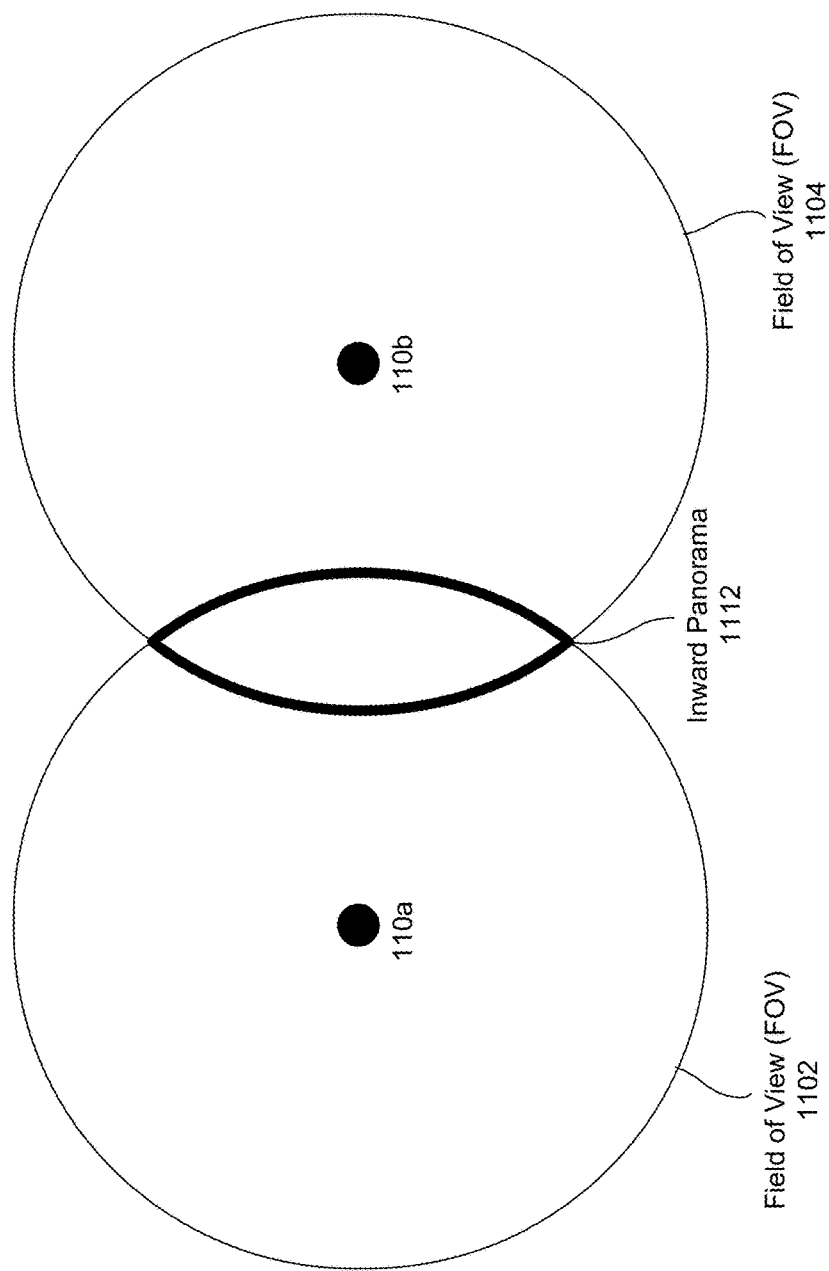

MULTIPLE CAMERA PANORAMIC IMAGES

BACKGROUND

With the advancement of technology, the use and popularity of electronic devices has increased considerably. Electronic devices are commonly used to capture videos. Disclosed herein are technical solutions to improve a field of view of the resulting videos.

BRIEF DESCRIPTION OF DRAWINGS

For a more complete understanding of the present disclosure, reference is now made to the following description taken in conjunction with the accompanying drawings.

FIG. 1 illustrates an overview of a system for increasing a field of view using multiple devices according to embodiments of the present disclosure.

FIGS. 2A-2B illustrate examples of panoramic images and cropped images according to embodiments of the present disclosure.

FIG. 3 illustrates an example of combining field of views from multiple image capture devices according to embodiments of the present disclosure.

FIG. 4 is a flowchart conceptually illustrating an example method for associating video data according to embodiments of the present disclosure.

FIGS. 5A-5B are examples of determining an orientation of video data from image capture devices according to embodiments of the present disclosure.

FIG. 6 is a flowchart conceptually illustrating an example method for determining an orientation of video data from image capture devices according to embodiments of the present disclosure.

FIGS. 7A-7B illustrate examples of replacing portions of first video data to remove an object according to embodiments of the present disclosure.

FIG. 8 is a flowchart conceptually illustrating an example method for removing an object from the first video data according to embodiments of the present disclosure.

FIGS. 9A-9C illustrate examples of adding objects to combined video data according to embodiments of the present disclosure.

FIG. 10 is a flowchart conceptually illustrating an example method for adding an object to combined video data according to embodiments of the present disclosure.

FIGS. 11A-11B illustrate examples of generating combined video data according to embodiments of the present disclosure.

DETAILED DESCRIPTION

Figure 9B:
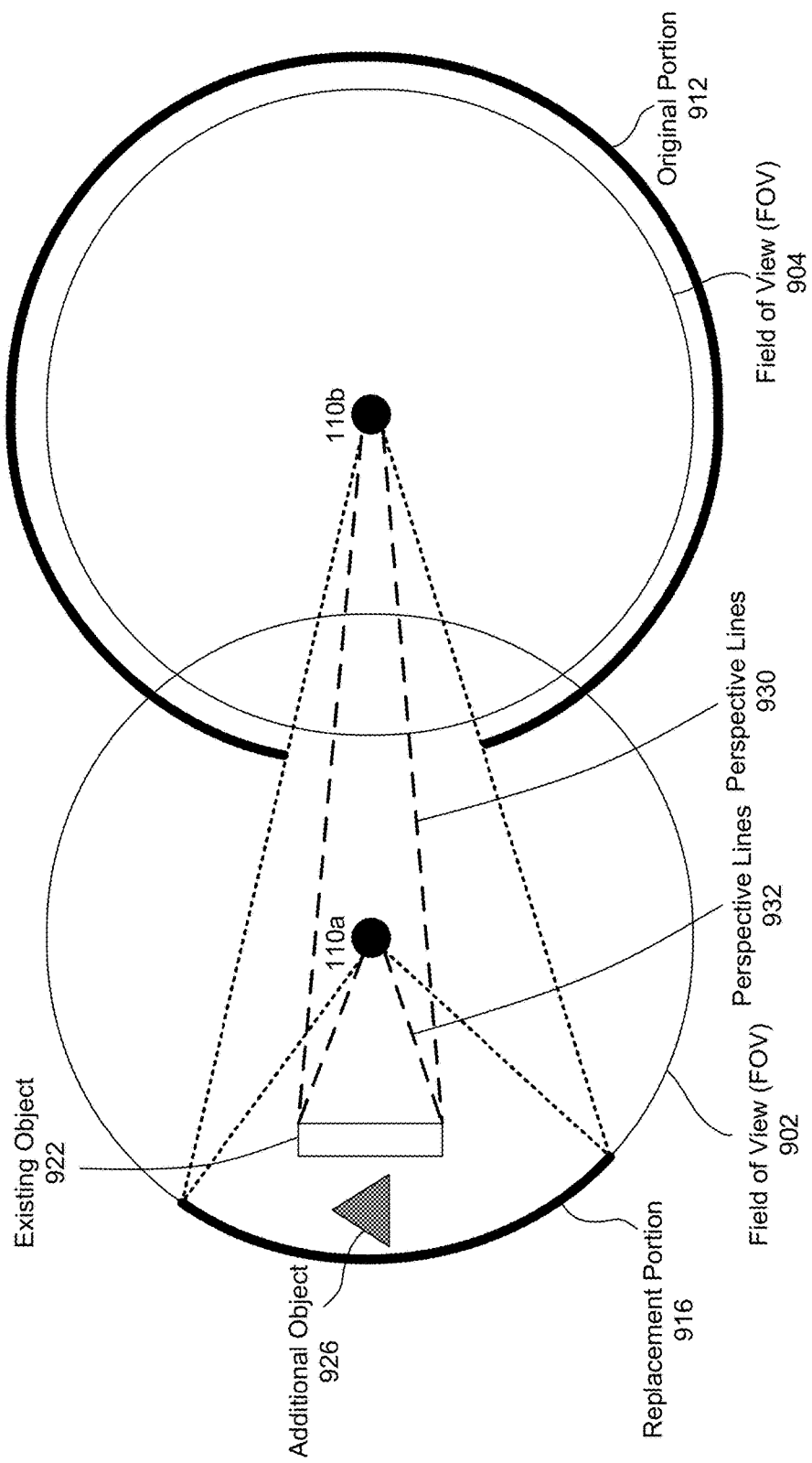

Electronic devices are commonly used to capture image/video data. While the video data may include a wide horizontal field of view in order to capture a wide area, the video data is typically captured from a single location and therefore may be limited by objects obstructing a view and/or a field of view. However, multiple devices may be in proximity to each other and may capture video from different perspectives. The video from those different perspective may be combined in a variety of ways to expand a field of view, remove obstacles, insert objects or perform other manipulation of the combined video data to enhance a user experience.

To provide additional functionality, devices, systems and methods are disclosed that generate output video data by stitching video data from multiple image capture devices. For example, a first image capture device may capture a first field of view with a first perspective and a second image capture device may be located a short distance from the first image capture device and may capture a second field of view with a second perspective. By combining the video data from the first image capture device and the second image capture device, the output video data may include a third (i.e., combined) field of view including the first field of view and the second field of view. The output video data may determine a perspective based on the first perspective and the second perspective. In addition, the different perspectives may allow objects to be removed or added to the output video data, with proper scaling and masking, or a virtual environment to be generated using the first video data and the second video data.

FIG. 1 illustrates an overview of a system 100 for implementing embodiments of the disclosure. The system 100 includes a first image capture device 110*a*, a second image capture device 110*b*, a device 102, and server(s) 112 all in communication with each other. While the following descriptions refer to the server(s) 112 performing steps illustrated in the drawings, the device 102 and/or the image capture devices 110 may perform any or all of the steps without departing from the present disclosure. Thus, the operations described below may be executed by a combination of components including the device 102, the image capture devices 110 and/or the server(s) 112. As illustrated in FIG. 1, the device 102 may include a display 104 that may display video data captured by one or more camera(s) 115 of the image capture devices 110.

The server(s) 112 may receive (120) first video data from a first image capture device 110*a* and may receive (122) second video data from a second image capture device 110*b*. The server(s) 112 may align (124) the first video data and the second video data. For example, the server(s) 112 may translate individual pixel values to align the second video data with the first video data. The second video data may be aligned using an offset, which may include a rotation value (e.g., rotation offset value) and a translation value, although the disclosure is not limited thereto.

The server(s) 112 may remove (126) a first object from the first video data and/or second video data. For example, the first object may be represented in the first video data and may obstruct or obscure a view. The second video data may capture the view obstructed by the first object and the server(s) 112 may replace portions of the first video data with portions of the second video data that correspond to the view. Thus, instead of including the first object in the combined video data, the combined video data may include the view captured by the second video data.

The server(s) 112 may add (128) a second object. For example, the server(s) 112 may determine to add a second object in front of the first object, which consists of inserting pixel values associated with the second object using a proper scaling and/or perspective. Additionally or alternatively, the server(s) 112 may determine to add the second object behind the first object, which consists of determining first pixel values associated with the second object, masking the first pixel values using the first object to determine second pixel values and inserting the second pixel values into the combined video data, which results in the second object being represented as though it is partially obscured by the first object.

The server(s) 112 may generate (130) a virtual panorama using the first video data and the second video data. For example, the virtual panorama may have a perspective different from the first video data and the second video data and may be determined using a combination of the first video data and the second video data. Additionally or alternatively, the virtual panorama may be a virtual environment, which may render the panorama differently based on a position within the virtual environment. In some examples, the virtual environment may be three dimensional (3D).

The server(s) 112 may determine (132) a transition between the first video data and the second video data, may combine (134) portions of the first video data with portions of the second video data and may output (136) combined video data.

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

The image capture device 110 may capture the video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The video data may be generated using one camera or a plurality of cameras and may have an aspect ratio exceeding 2:1. An aspect ratio is a ratio of one dimension of a video frame to another dimension of a video frame (for example height-width or width-height). For example, a video frame having a resolution of 7680 pixels by 1080 pixels corresponds to an aspect ratio of 64:9 or more than 7:1. While the video data may have a certain aspect ratio (for example 7:1 or other larger than 2:1 ratio) and may be considered panoramic video data due to a panoramic/360 degree nature of the incoming video data (Which may result from a single panoramic camera or multiple images taken from multiple cameras combined to make a single frame of the panoramic video data), the portion of the panoramic video data displayed on the display 104 may have an aspect ratio that is likely to be used on a viewing device. As a result, an aspect ratio of the portion of the panoramic video data displayed on the display 104 may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the displayed video data may vary based on user preferences. Similarly, an aspect ratio of output video data (e.g., a video summarization) may be lower than 2:1, as the output data is intended to be displayed on a display.

Pixel coordinates may specify a position within a video frame. For example, if the video frame has a resolution of 7680 pixels by 1080 pixels, a pixel coordinate of a bottom left pixel in the video frame may have pixel coordinates of (0, 0), a pixel coordinate of a top left pixel in the video frame may have pixel coordinates of (0, 1080), a pixel coordinate of a top right pixel in the video frame may have pixel coordinates of (7680, 1080) and a bottom right pixel in the video frame may have pixel coordinates of (7680, 0). Similarly, if the displayed video frame has a resolution of 1920 pixels by 1080 pixels, a pixel coordinate of a bottom left pixel in the displayed video frame may have pixel coordinates of (0, 0) in the video frame, a pixel coordinate of a top left pixel in the displayed video frame may have pixel coordinates of (0, 1080) in the video frame, a pixel coordinate in a top right pixel in the displayed video frame may have pixel coordinates of (1920, 1080) in the video frame and a bottom right pixel in the displayed video frame may have pixel coordinates of (1920, 0) in the video frame.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user 10 of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

FIG. 3 illustrates an example of combining field of views from multiple image capture devices according to embodiments of the present disclosure. As illustrated in FIG. 3, a first image capture device 110a may capture first video data having a first field of view (FOV) 302 and a second image capture device 110b may capture second video data having a second FOV 304. When the first image capture device 110a and the second image capture device 110b are positioned vertically, the server(s) 112 may generate combined video data based on the first video data and the second video data. In some examples, the combined video data may include the first FOV 302 and the second FOV 304 to generate a panorama having a larger FOV. In other examples, the server(s) 112 may replace portions of the first video data with corresponding portions of the second video data to remove objects represented in the first video data. In some examples, the server(s) 112 may generate a virtual environment, which may be three dimensional, using the combined video data.

In order for the server(s) 112 to stitch first video data from the first image capture device 110a and second video data from the second image capture device 110b, the server(s) 112 needs to determine that the first video data and the second video data are associated. The server(s) 112 may determine that the first video data and the second video data are associated using multiple techniques. As a first example, the first image capture device 110a and the second image capture device 110b may receive association information and may embed the association information in the first video data and the second video data. As a second example, the server(s) 112 may know of the association from user input, either directly input to the server(s) 112 or input to a remote device such as the device 102. The user input may indicate that the first video data and the second video data are associated and/or indicate that the first image capture device 110a and the second image capture device 110b are associated. From the user input, the server(s) 112 may determine the association between the first video data and the second video data. As a third example, the server(s) 112 may determine that the first video data is associated with the second video data based on the first video data and the second video data and any associated data.

FIG. 4 is a flowchart conceptually illustrating an example method for associating video data according to embodiments of the present disclosure. FIG. 4 illustrates an example of the server(s) 112 determining that the first video data is associated with the second video data based on the first video data and the second video data and any associated data. For example, the server(s) 112 may determine that a location and timestamp(s) associated with the first video data match a location and timestamp(s) associated with the second video data. Based on the proximity between the first video data and the second video data in space and time, the server(s) 112 may perform image matching or other techniques to determine if pixel values overlap between the first video data and the second video data.

As illustrated in FIG. 4, the server(s) 112 may receive (410) the first video data and may receive (412) the second video data. The server(s) 112 may determine (414) a first location associated with the first video data, may determine (416) a second location associated with the second video data, may determine (418) a distance between the first location and the second location and may determine (420) that the distance is below a threshold. For example, the first video data may be associated with geographic information (e.g., embedded in the first video data, included in annotation data associated with the first video data or the like). If geographic information associated with the second video data is within proximity to the geographic information associated with the first video data, the server(s) 112 may determine that the first video data was captured near the second video data and there may be a relationship between the first video data and the second video data.

The server(s) 112 may determine (422) a first time period associated with the first video data, determine (424) a second time period associated with the second video data and determine (426) that the second time period overlaps the first time period. For example, the server(s) 112 may determine the first time period based on timestamps included in the first video data and may determine the second time period based on timestamps included in the second video data. While the first video data and the second video data may be captured from coupled image capture devices 110, the server(s) 112 may determine that the first video data and the second video data are not associated if the timestamps don't align.

In addition to determining a proximity between the first video data and the second video data in space and time, the server(s) 112 may determine if pixels values of the first video data overlaps pixel values of the second video data. For example, the server(s) 112 may determine (428) a first scene represented in first video data, determine (430) a second scene represented in second video data and determine (432) if the second scene matches the first scene. The server(s) 112 may associate (434) the second video data with the first video data.

For ease of explanation, the steps illustrated in FIG. 4 are described with regard to the server(s) 112. However, some or all of the steps illustrated in FIG. 4 may be executed by the device 102, the image capture devices 110, the server(s) 112, a remote device or any combination thereof. In addition, any of the steps illustrated in FIG. 4 may be omitted or reordered without departing from the present disclosure.

FIGS. 5A-5B are examples of determining an orientation of video data from image capture devices according to embodiments of the present disclosure. As illustrated in FIGS. 5A-5B, a first image capture device 110a may capture first video data having a first field of view (FOV) 502 and a second image capture device 110b may capture second video data having a second FOV 504. For purposes of this disclosure, the first image capture device 110a and the second image capture device 110b are assumed to be aligned vertically (e.g., vertical faces parallel to each other) at a fixed height, such that the first video data and the second video data may be combined without correcting for vertical skew. If the first image capture device 110a and the second image capture device 110b are not aligned vertically (e.g., top surfaces point in different directions) and/or not at the same height, the server(s) 112 may employ techniques known to one of skill in the art to correct differences in perspective between the first video data and the second video data prior to determining the orientation.

To clearly illustrate differences between video data captured by the first image capture device 110a and the second image capture device 110b, the following drawings illustrate the first FOV 502 and the second FOV 504 as overlapping circles separated by a distance larger than a radius of the circles. However, this illustration is not to scale and may be misleading. For example, the image capture devices 110 may capture an area surrounding the image capture devices 110 that is an order of magnitude larger than a first distance between the first image capture device 110a and the second image capture device 110b (e.g., the area may extend for hundreds or thousands of feet while the image capture devices 110 may be situated five to fifty feet apart, although the disclosure is not limited thereto). Therefore, if the first FOV 502 and the second FOV 504 were drawn to scale, the first FOV 502 and the second FOV 504 would be illustrated as two circles centered on roughly the same point, with a small offset equal to the first distance between the first image capture device 110a and the second image capture device 110b. Thus, vectors between the image capture devices 110 and an object in the distance (e.g., first frame of reference 512) would be substantially similar, with a minor difference in angle caused by the first distance. However, in order to clearly illustrate the following examples, the first FOV 502 and the second FOV 504 are not drawn to scale. Therefore, while FIG. 5A illustrates the second FOV 504 ending between the first image capture device 110a and the second image capture device 110b, the second FOV 504 actually extends beyond the first image capture device 110a and the first frame of reference 512 is included in the first FOV 502 and the second FOV 504. Thus, the first image capture device 110a and the second image capture device 110b aren't on opposing sides of the first frame of reference 512, but instead capture the same side of the first frame of reference 512 from slightly different perspectives based on the first distance.

As illustrated in FIG. 5A, the server(s) 112 may determine the first frame of reference 512 and a second frame of reference 514 represented in both the first video data and the second video data. For example, the server(s) 112 may identify that the first frame of reference 512 and the second frame of reference 514 are on opposite sides of both the first video data and the second video data. Therefore, the server(s) 112 may determine that the first image capture device 110a and the second image capture device 110b are positioned in a line between the first frame of reference 512 and the second frame of reference 514.

To determine a distance between the first image capture device 110a and the second image capture device 110b, the server(s) 112 may determine a vector 521 describing at least a direction from the first image capture device 110a to a location of the first frame of reference 512, a vector 522 describing at least a direction from the first image capture device 110a to a location of the second frame of reference 514, a vector 523 describing at least a direction from the second image capture device 110b to the location of the first frame of reference 512 and a vector 524 describing at least a direction from the second image capture device 110b to the location of the second frame of reference 514. A magnitude of a distance associated with the vectors 521-524 may be determined based on a selected FOV associated with the first video data and the second video data, as discussed in greater detail below with regard to determining an elliptical panorama. The server(s) 112 may also determine a size of the first frame of reference 512 in the first video data and in the second video data, and a size of the second frame of reference 514 in the first video data and in the second video data. By comparing the vectors 521-524 and the relative sizes of the first frame of reference 512 and the second frame of reference 514, the server(s) 112 may determine an orientation of the second image capture device 110b relative to the first image capture device 110a. The orientation may indicate a first vector describing at least a direction from a location of the first image capture device 110a to a location of the second image capture device 110b and a first distance between the first image capture device 110a and the second image capture device 110b. The server(s) 112 may use the orientation to determine an orientation between the first video data and the second video data in order to generate combined video data and/or a virtual environment.

In some examples, the first image capture device 110a is not visible to the second image capture device 110b and vice versa. Therefore, the server(s) 112 may not determine the first frame of reference 512 and/or the second frame of reference 514 in both the first video data and the second video data. FIG. 5B illustrates a second example of determining an orientation of the second image capture device 110b relative to the first image capture device 110a. Instead of identifying frame of references on opposing sides of both the first video data and the second video data, FIG. 5B illustrates the server(s) 112 determining a frame of reference 516 between the first image capture device 110*a* and the second image capture device 110*b*. Thus, the server(s) 112 identifies the frame of reference 516 in portions of the first video data associated with the second image capture device 110*b* and in portions of the second video data associated with the first image capture device 110*a*.

To determine the orientation between the first image capture device 110*a* and the second image capture device 110*b*, the server(s) 112 may determine a vector 525 describing at least a direction from the first image capture device 110*a* to a location of the frame of reference 516 and a vector 526 describing at least a direction from the second image capture device 110*b* to the location of the frame of reference 516. The server(s) 112 may also determine a size of the frame of reference 516 in the first video data and in the second video data. By comparing the vectors 525-526 and the relative sizes of the frame of reference 516, the server(s) 112 may determine an orientation of the second image capture device 110*b* relative to the first image capture device 110*a*. The orientation may indicate a first vector describing at least a direction from a location of the first image capture device 110*a* to a location of the second image capture device 110*b* and a first distance between the first image capture device 110*a* and the second image capture device 110*b*. The server(s) 112 may use the orientation to determine an orientation between the first video data and the second video data in order to generate combined video data and/or a virtual environment.

While FIG. 5B illustrates a single frame of reference, the server(s) 112 may determine multiple frames of reference in the first video data and the second video data to determine the orientation between the first image capture device 110*a* and the second image capture device 110*b*. Similarly, while FIG. 5B illustrates the frame of reference 516 being located between the first image capture device 110*a* and the second image capture device 110*b*, the present disclosure is not limited thereto and the server(s) 112 may determine a frame of reference at any location provided the frame of reference is visible in both the first video data and the second video data.

While FIGS. 5A-5B illustrate examples of determining an orientation between two image capture devices, the disclosure is not limited thereto and the steps described above may be used to determine an orientation between three or more image capture devices.

FIG. 6 is a flowchart conceptually illustrating an example method for determining an orientation of video data from image capture devices according to embodiments of the present disclosure. As illustrated in FIG. 6, the server(s) 112 may determine (610) first pixel coordinates associated with a first object represented in the first video data, may determine (612) a first vector describing at least a direction from the first image capture device to a location of the first object and determine (614) a first size associated with a representation of the first object in the first video data. The server(s) 112 may determine (616) second pixel coordinates associated with the first object represented in the second video data, determine (618) a second vector describing at least a direction from the second image capture device to the location of the first object and determine (620) a second size associated with a representation of the first object in the second video data.

The server(s) 112 may determine (622) the location of the first object using the first vector and the second vector, determine (624) a first distance between the first object and the first image capture device and determine (626) a second distance between the first object and the second image capture device. The server(s) 112 may determine (628) an orientation of the second image capture device relative to the first image capture device using the first distance, the first size, the second distance and the second size. For example, the orientation may indicate a first vector describing at least a direction from a first location of the first image capture device to a second location of the second image capture device and a first distance between the first image capture device and the second image capture device. In some examples, the server(s) 112 may perform steps 610-626 for multiple objects and/or data points to increase an accuracy associated with the determined orientation. Therefore, the server(s) 112 may determine the orientation based on additional distances and/or sizes associated with additional objects.

In some examples, video data captured by a single image capture device 110 may include an object that a user may wish to remove from the video data and/or that is blocking a view that the user may wish to include in the video data. For example, the object may obstruct a scenic view, a portion of a playing field or the like. To remove the object and/or include the view, portions of video data from one or more additional image capture devices 110 may be combined with the video data in place of the obstructed view.

FIGS. 7A-7B illustrate examples of replacing portions of video data to remove an object according to embodiments of the present disclosure. As illustrated in FIG. 7A, first video data captured by a first image capture device 110*a* having a first field of view (FOV) 702 may be used to augment second video data captured by a second image capture device 110*b* having a second FOV 704. The server(s) 112 may determine that an obstruction 720 is represented in the second video data that obstructs an obstructed portion 714 of the second video data. For example, instead of including scenery such an ocean view, the second video data includes the obstruction 720, such as a tree, a building or other structure or the like.

The server(s) 112 may determine that the first video data includes a replacement portion 716 that corresponds to the obstructed portion 714. For example, the server(s) 112 may determine a first vector describing at least a direction from the second image capture device 110*b* to a first location associated with a beginning of the obstructed portion 714 (e.g., one end of the obstruction 720) and a second vector describing at least a direction from the second image capture device 110*b* to a second location associated with an end of the obstructed portion 714 (e.g., other end of the obstruction 720). Using the first vector and the second vector, the server(s) 112 may determine the replacement portion 716 in the first video data corresponding to the obstructed portion 714.

The server(s) 112 may generate combined video data using an original portion 712 of the second video data and the replacement portion 716 of the first video data, effectively removing the obstruction 720. In some examples, the server(s) 112 may perform additional processing on the replacement portion 716 so that a perspective and/or scale of the replacement portion 716 matches the original portion 712. For example, the replacement portion 716 includes a larger portion of the first FOV 702 than the obstructed portion 714 does of the second FOV 704. Therefore, the server(s) 112 may compensate for differences between the FOVs. As an example, if the obstructed portion 714 includes N pixels and the replacement portion 716 includes M pixels, the replacement portion 716 may be scaled using a scale factor of M/N.

While FIG. 7A illustrates the obstruction 720 facing the first image capture device 110a, the disclosure is not limited thereto. FIG. 7B illustrates a second example of replacing an object using a portion of the first video data. As illustrated in FIG. 7B, the server(s) 112 may determine that an obstruction 722 is represented in the second video data that obstructs an obstructed portion 734 of the second video data. For example, instead of including scenery such an ocean view, the second video data includes the obstruction 722, such as a tree, a building or other structure or the like.

The server(s) 112 may determine that the first video data includes a replacement portion 736 that corresponds to the obstructed portion 734. For example, the server(s) 112 may determine a first vector describing at least a direction from the second image capture device 110b to a first location associated with a beginning of the obstructed portion 734 (e.g., one end of the obstruction 722) and a second vector describing at least a direction from the second image capture device 110b to a second location associated with an end of the obstructed portion 734 (e.g., other end of the obstruction 722). Using the first vector and the second vector, the server(s) 112 may determine the replacement portion 736 in the first video data corresponding to the obstructed portion 734.

The server(s) 112 may generate combined video data using an original portion 732 of the second video data and the replacement portion 736 of the first video data, effectively removing the obstruction 722. In some examples, the server(s) 112 may perform additional processing on the replacement portion 736 so that a perspective and/or scale of the replacement portion 736 matches the original portion 732. For example, the replacement portion 736 includes a larger portion of the first FOV 702 than the obstructed portion 734 does of the second FOV 704. Therefore, the server(s) 112 may compensate for differences between the FOVs.

While FIGS. 7A-7B illustrate examples of combining video data from two image capture devices, the present disclosure is not limited thereto and the server(s) 112 may generate combined video data using three or more image capture devices without departing from the disclosure.

FIG. 8 is a flowchart conceptually illustrating an example method for removing an object from video data according to embodiments of the present disclosure. As illustrated in FIG. 8, the server(s) 112 may detect (810) an object to remove in first video data, determine (812) an obstructed portion of the first video data that includes the object and determine (814) an original portion of the first video data that does not include the obstructed portion.

The server(s) 112 may determine (816) a first vector describing at least a direction from the first image capture device to a first location associated with a beginning of the obstructed portion (e.g., one end of the obstruction) and determine (818) a second vector describing at least a direction from the first image capture device to a second location associated with an end of the obstructed portion (e.g., other end of the obstruction). A magnitude of a distance associated with the vectors may be determined based on a selected FOV associated with the first video data and the second video data, as discussed in greater detail below with regard to determining an elliptical panorama. Using the first vector and the second vector, the server(s) 112 may determine (820) a beginning of a replacement portion of the second video data corresponding to the obstructed portion of the first video data and may determine (822) an ending of the replacement portion. The server(s) 112 may combine (824) the original portion of the first video data and the replacement portion of the second video data in combined video data.

In addition to removing objects and/or portions of the video data, the server(s) 112 may add objects and/or additional portions of video data. FIGS. 9A-9C illustrate examples of adding objects to combined video data according to embodiments of the present disclosure. As illustrated in FIG. 9A, first video data captured by a first image capture device 110a may have a first FOV 902 and second video data captured by a second image capture device 110b may have a second FOV 904. As described above with regard to FIGS. 7A-7B, the server(s) 112 may combine an original portion 912 of the second video data and a replacement portion 916 of the first video data.

The server(s) 112 may determine to add an additional object 924 in front of an existing object 922. To determine a proper scale and/or perspective associated with the additional object 924, the server(s) 112 may determine a scale and/or perspective associated with the existing object 922, although the disclosure is not limited thereto. After determining the proper scale and/or perspective associated with the additional object 924, the server(s) 112 may insert the additional object 924 in the combined video data, overlaid above the replacement portion 916. For example, the combined video data may include the replacement portion 916 and the existing object 922, but the additional object 924 will be represented in its entirety in front of the existing object 922, obstructing portions of the existing object 922.

In some examples, the server(s) 112 may insert an additional object behind an existing object. Instead of the additional object obstructing a view of the existing object, in this example the existing object obstructs a view of the additional object. Therefore, instead of inserting the additional object in its entirety into the combined video data, the server(s) 112 may determine a proper scale and/or perspective associated with the additional object and may mask portions of the additional object that are obscured by the existing object. As illustrated in FIG. 9B, the server(s) 112 may determine to insert an additional object 926 at a position behind an existing object 922 in the combined video data. Therefore, the server(s) 112 may determine a scale and/or perspective of the existing object 922 using perspective lines 930 from the second image capture device 110b to the existing object 922 and perspective lines 932 from the first image capture device 110a to the existing object 922. By comparing the perspective lines 930 and the perspective lines 932, the server(s) 112 may determine a scale, perspective, size and/or distance associated with the existing object 922 and may modify the additional object 926 accordingly. In addition, the server(s) 112 may determine pixel coordinates associated with the existing object 922 and may mask portions of the additional object 926 based on the pixel coordinates. Therefore, the combined video data may represent the additional object 926 at a position behind the existing object 922.

FIG. 9C illustrates an example of adding an additional object using a different perspective or orientation. As illustrated in FIG. 9C, the server(s) 112 may determine to insert an additional object 944 behind an existing object 942 in the combined video data. Therefore, the server(s) 112 may determine a scale and/or perspective of the existing object 942 using perspective lines 950 from the second image capture device 110b to the existing object 942 and perspective lines 952 from the first image capture device 110a to the existing object 942. By comparing the perspective lines 950 and the perspective lines 952, the server(s) 112 may determine a scale, perspective, size and/or distance associated with the existing object 942 and may modify the additional object 944 accordingly. In addition, the server(s) 112 may determine pixel coordinates associated with the existing object 942 and may mask portions of the additional object 944 based on the pixel coordinates. Therefore, the combined video data may represent the additional object 944 at a position behind the existing object 942.

In contrast to the example illustrated in FIG. 9B, FIG. 9C illustrates the combined video data including an original portion 932 of the second video data without including a replacement portion from the first video data. Therefore, the server(s) 112 may use the first video data to determine a scale, perspective, distance or the like associated with the existing object 942 in order to insert the additional object 944 in the combined video data without including any of the first video data in the combined video data.

FIG. 10 is a flowchart conceptually illustrating an example method for adding an object to combined video data according to embodiments of the present disclosure. As illustrated in FIG. 10, the server(s) 112 may determine (1010) first pixels associated with a first object in the first video data and determine (1012) a first vector describing at least a direction from the first image capture device to a location of the first object. The server(s) 112 may determine (1014) that the first object is represented in second video data, may determine (1016) a second vector describing at least a direction from the second image capture device to the location and may determine (1018) a distance between the first object and the first image capture device. The server(s) 112 may determine (1020) to insert a representation of a second object in the combined video data, may determine (1022) a perspective associated with the second object and may determine (1024) second pixels representing the second object.

The server(s) 112 may determine (1026) if the second object is to be inserted closer than the first object (e.g., second distance between the second object and the first image capture device is less than the first distance). If the second object is to be inserted closer than the first object, the server(s) 112 may skip (1028) to step 1032 and may insert (1032) the second pixels in the combined video data. If the second object is to be inserted farther than the first object (e.g., second distance is greater than the first distance), the server(s) 112 may mask (1030) the second pixels using the first pixels and may insert (1032) the masked second pixels into the combined video data.

FIGS. 11A-11B illustrates examples of generating combined video data according to embodiments of the present disclosure. As illustrated in FIGS. 11A-11B, first video data captured by a first image capture device 110a may have a first FOV 1102 and second video data captured by a second image capture device 110b may have a second FOV 1104. As illustrated in FIG. 11A, the server(s) 112 may combine outward portions of the first video data and the second video data to generate an outer panorama 1110. The outer panorama 1110 may have a relatively large FOV and may include additional video data representing an environment around the image capture devices 110. In contrast, the server(s) 112 may combine inward portions of the first video data and the second video data to generate an inward panorama 1112. The inward panorama 1112 may have a relatively small FOV but subjects represented in the inward panorama 1112 may be relatively larger. Therefore, the outward panorama 1110 may be used to represent environmental shots focusing on scenery whereas the inward panorama 1112 may be used to represent people shots focusing on individual or groups of people. For example, for image capture devices 110 positioned near a stage at a rock concert, the outward panorama 1110 may capture the audience whereas the inward panorama 1112 may capture the performance. As another example, for image capture devices 110 positioned at a construction site, the outward panorama 1110 may be used for security purposes and the inward panorama 1112 may be used for a safety audit.

Figure 12A:
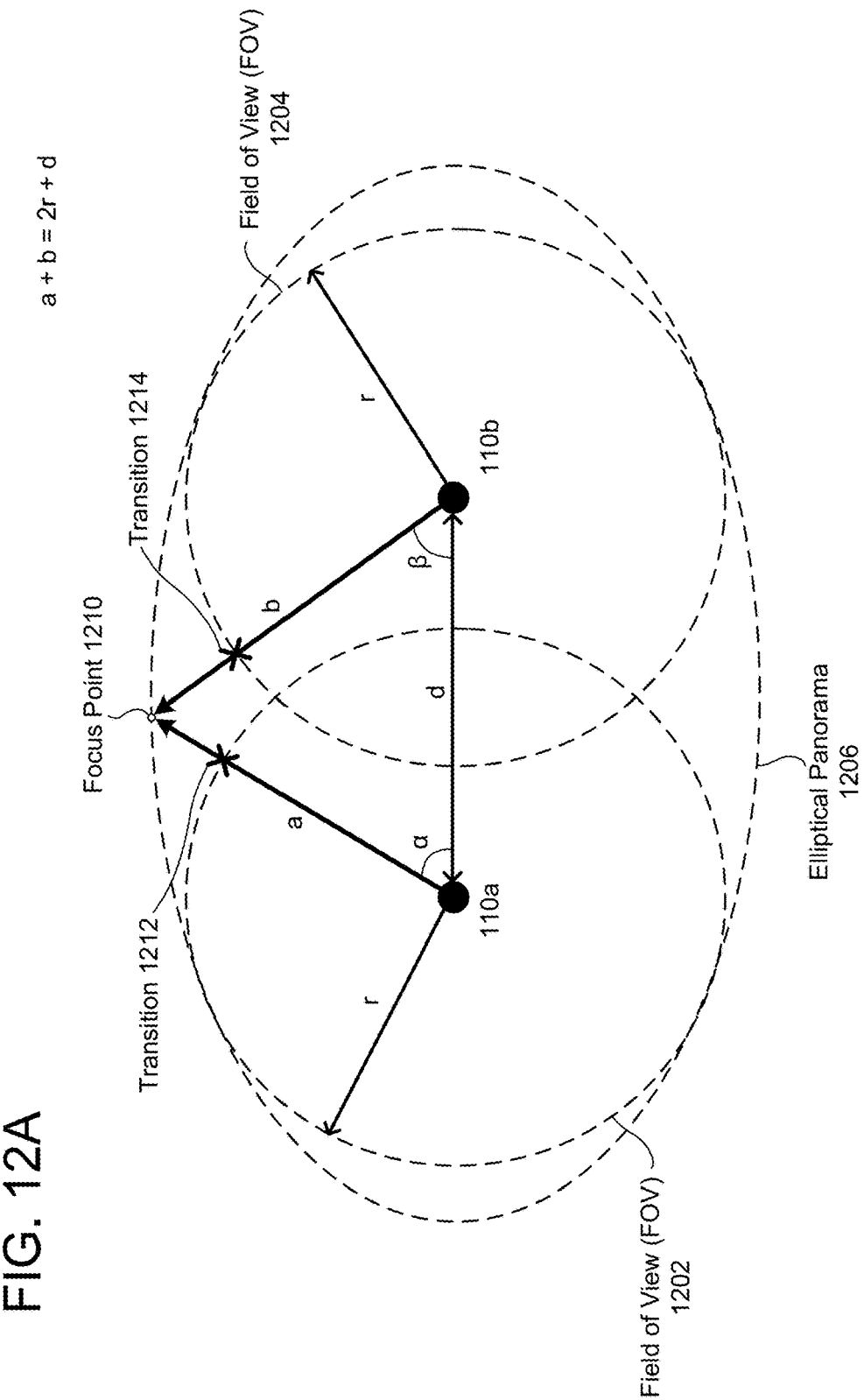
FIGS. 12A-12B illustrate examples of adaptively determining transition points in combined video data according to embodiments of the present disclosure.
Figure 12B:
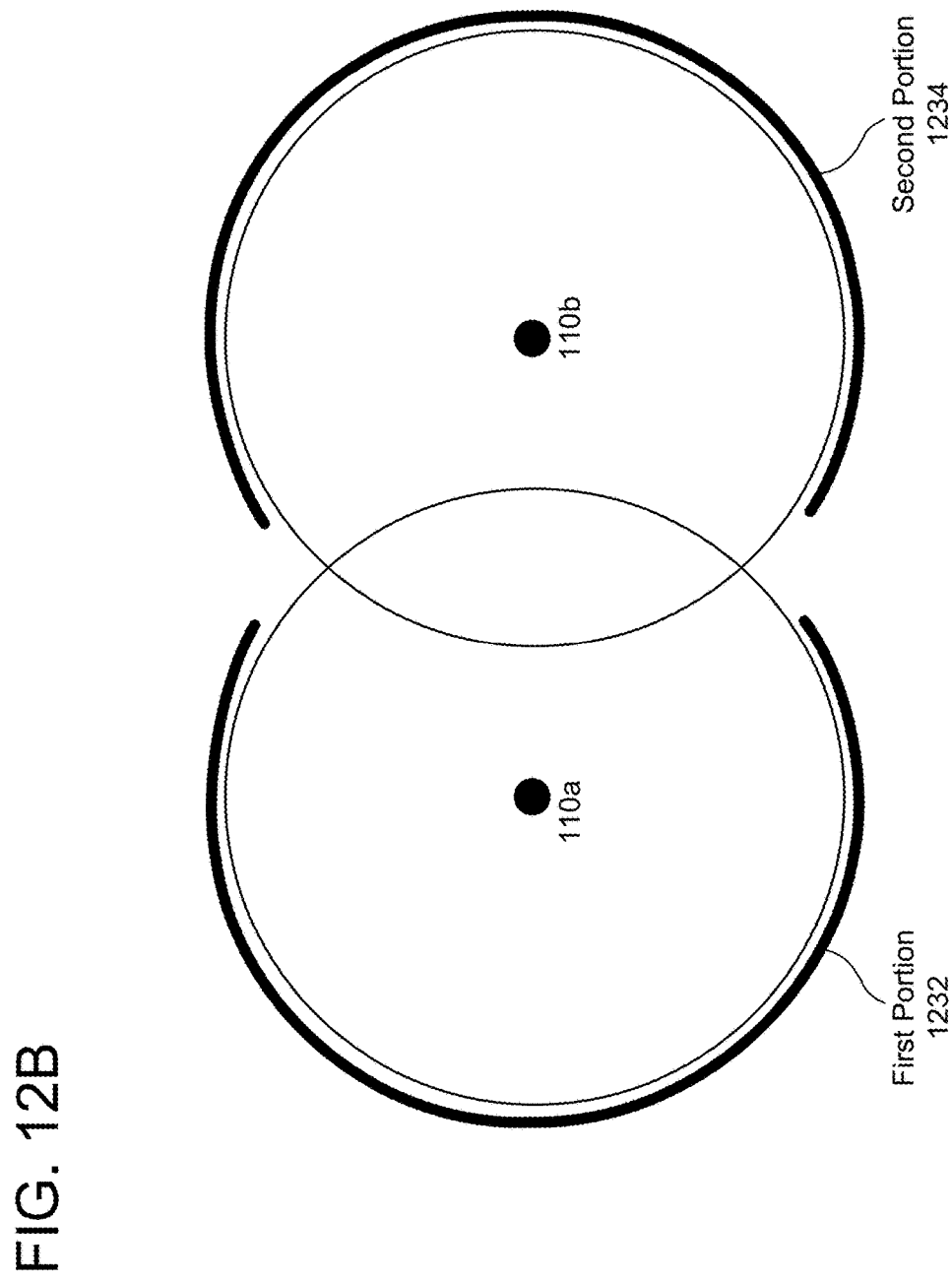

FIGS. 12A-12B illustrate examples of adaptively determining transition points in combined video data according to embodiments of the present disclosure. A first image capture device 110a may capture first video data having a first FOV 1202 and a second image capture device 110b may capture second video data having a second FOV 1204. As illustrated in FIG. 12A, the first FOV 1202 and the second FOV 1204 may have a radius r that corresponds to a focus distance, although the disclosure is not limited thereto. The server(s) 112 may determine the focus distance in order to combine the first video data and the second video data, instead of assuming a focus distance of infinity. Using the focus distance, the server(s) 112 may determine transition points between the first video data and the second video data prior to combining the first video data and the second video data.

For example, the server(s) 112 may determine the radius corresponding to the focus distance and may determine a distance d between the first image capture device 110a and the second image capture device 110b. The server(s) 112 may determine an elliptical panorama 1206 using the first video data and the second video data. To determine the transition points between the first video data and the second video data, the server(s) 112 may determine a first focus point 1210 along the elliptical panorama 1206. In some examples, the server(s) 112 may determine the first focus point 1210 based on pixel values included in the first video data and the second video data (e.g., determine that portions of the first video data and the second video data includes similar pixel values). For example, the server(s) 112 may determine the first focus point 1210 based on an object that is visible in the first video data and the second video data. Additionally or alternatively, the server(s) 112 may determine the first focus point 1210 based on an absence of object in order to stitch the first video data and the second video data without artifacts and/or distortion. For example, the server(s) 112 may determine that the first video data and the second video data capture an area of similar pixel values, such as the sky, and may place the first focus point 1210 in the area of similar pixel values to improve the stitching process.

In some examples, the server(s) 112 may determine specific angles and/or distances from the first image capture device 110a and the second image capture device 110b. For example, the server(s) 112 may determine a distance d between the first image capture device 110a and the second image capture device 110b and a radius r (e.g., selected FOV) associated with the first FOV 1202 and the second FOV 1204 based on an area surrounding the image capture devices 110. For example, the server(s) 112 may select the radius r (e.g., selected FOV) to be a fixed distance from a starting distance to infinity (e.g., 10 meters, 100 meters or the like) to determine a curvature of the elliptical panorama 1206. For example, the server(s) 112 may select a small radius r for a small space (e.g., indoor location) as the furthest object represented in the video data is relatively close to the image capture devices 110. Additionally or alternatively, the server(s) 112 may select a large radius r for an open space (e.g., outdoor location with a scenic view) as the furthest object represented in the video data may be relatively far from the image capture devices 110.

By definition, an ellipse is a curve on a plane that surrounds two focal points such that the sum of the distances to the two focal points is constant for every point on the curve. Thus, a+b=2r+d. Using the Cosine theorem (a^2=b^2+d^2−2db cos β), for each given FOV(r), angle (β) and the distance (d), the server(s) 112 may calculate a and b. Using the Sine theorem (b/sin α=a/sin β), the server(s) 112 may determine a. Therefore, the server(s) 112 may determine a first distance a from the first image capture device 110a to the first focus point 1210 and a second distance b from the second image capture device 110b to the first focus point 1210.

Once the server(s) 112 determines the first distance a and the second distance b, the server(s) 112 may determine a first transition 1212 between the first image capture device 110a and the first focus point 1210 and a second transition 1214 between the second image capture device 110b and the first focus point 1210. As illustrated in FIG. 12A, the first transition 1212 and the second transition 1214 correspond to the first focus point 1210 but are associated with different angles within the FOV 1202/1204. The server(s) 112 may use similar techniques to determine a second focus point (not illustrated) and corresponding transitions (not illustrated) between the first video data and the second video data. The server(s) 112 may generate combined video data transitioning from the first transition 1212 in the first video data to the second transition 1214 in the second video data. As illustrated in FIG. 12B, the combined video data may include a first portion 1232 of the first video data and a second portion 1234 of the second video data.

Figure 13:
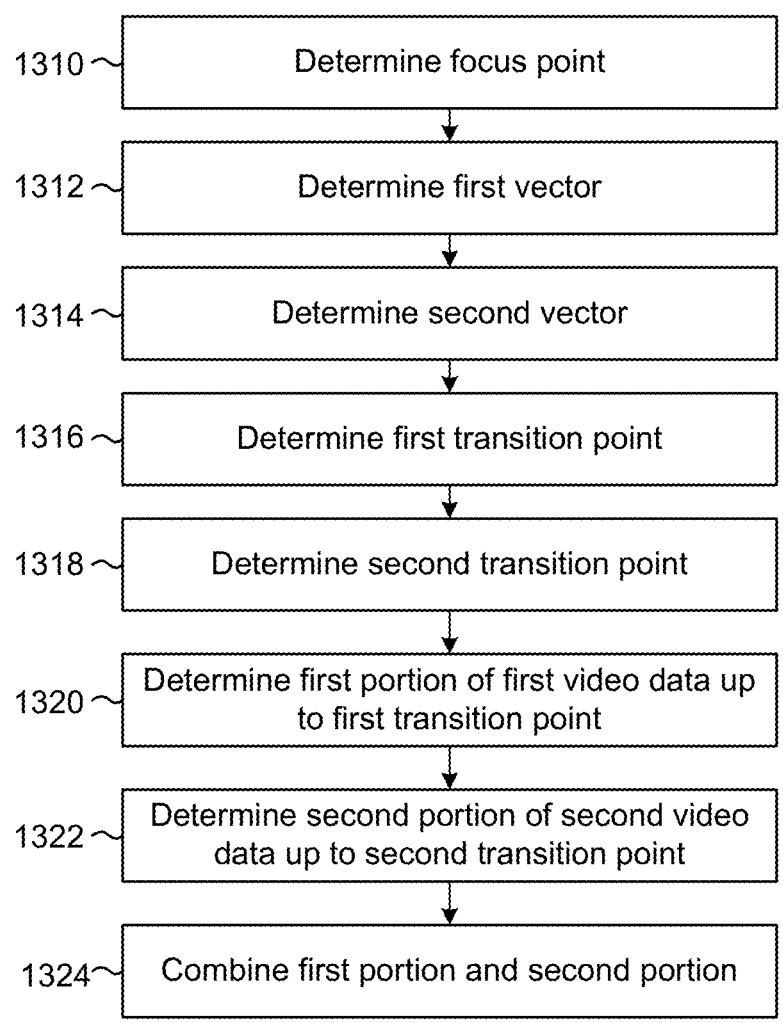
FIG. 13 is a flowchart conceptually illustrating an example method for determining transition points in combined video data according to embodiments of the present disclosure.

FIG. 13 is a flowchart conceptually illustrating an example method for determining transition points in combined video data according to embodiments of the present disclosure. As illustrated in FIG. 13, the server(s) 112 may determine (1310) a focus point corresponding to a location represented in both the first video data and the second video data. The server(s) 112 may determine (1312) a first vector describing at least a direction from the first image capture device to the location, determine (1314) a second vector describing at least a direction from the second image capture device to the location, determine (1316) a first transition point corresponding to the focus point in the first video data and determine (1318) a second transition point corresponding to the focus point in the second video data. The server(s) 112 may determine (1320) a first portion of the first video data up to the first transition point and determine (1322) a second portion of the second video data up to the second transition point. The server(s) 112 may combine (1324) the first portion and the second portion to generate combined video data. For example, the first transition point in the first data may correspond to the second transition point in the second video data in the combined video data.

Figure 14:
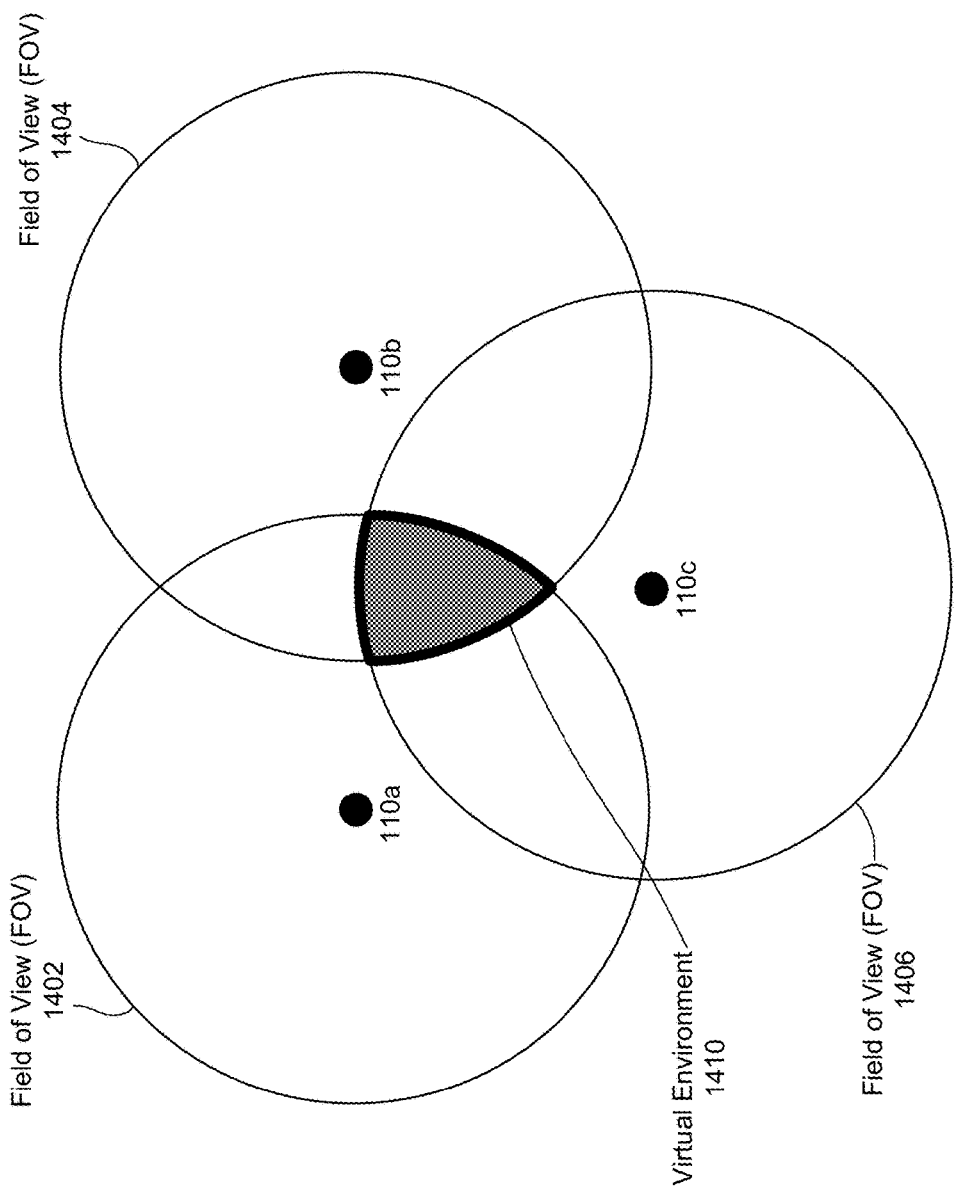
FIG. 14 illustrates an example of generating a virtual environment according to embodiments of the present disclosure.

FIG. 14 illustrates an example of generating a virtual environment according to embodiments of the present disclosure. As illustrated in FIG. 14, the server(s) 112 may generate a virtual environment 1410 using first video data captured by a first image capture device 110a (that has a first FOV 1402), second video data captured by a second image capture device 110b (that has a second FOV 1404) and third video data captured by a third image capture device 110c (that has a third FOV 1406). The virtual environment 1410 may simulate panoramas by weighting the first video data, the second video data and the third video data differently based on a position within the virtual environment. Therefore, a user may view the virtual environment as though actually present at the position.

In some examples, the virtual environment may be generated in three dimensions. For example, the image capture devices 110 may enable stereoscopic vision so that the virtual environment is a 3D stereoscopic virtual environment. By generating the virtual environment 1410, the server(s) 112 may place a virtual observer at any location in the virtual environment 1410 using a stereoscopic view for the observer from the three (or more) image capture devices 110 enclosing the virtual environment area. For example, it is possible to recreate a 3D image (depth) at any view angle and position for the observer inside the virtual environment area. When using two image capture devices 110, the stereoscopic image may be created only for a single point of view, but with three (and more) image capture devices 110 the point of view may be recalculated to place the observer at any origin.

Figure 15:
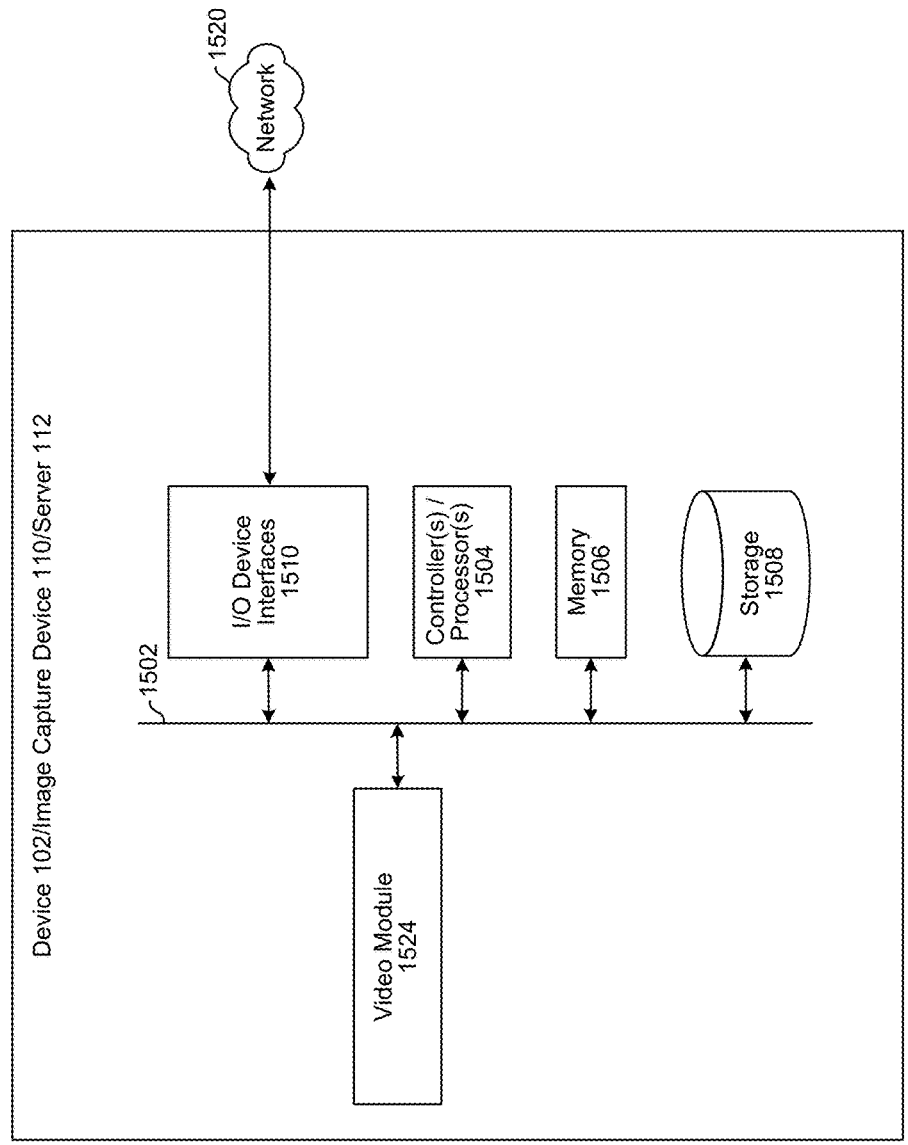
FIG. 15 is a block diagram conceptually illustrating example components of a system according to embodiments of the present disclosure.

FIG. 15 illustrates a block diagram conceptually illustrating example components of a system 100 including one or more of a device 102 and server(s) 112. Certain components illustrated in FIG. 15 may also be included in an image capture device 110 without departing from the present disclosure. Depending upon how the system is structured, some of the components illustrated in FIG. 15 as part of the device 102 or the server(s) 112 may be included only in the device 102 or in the server(s) 112, or may be distributed across multiple devices 102 and/or servers 112. Other components not illustrated may also be included in the device 102 and/or the server(s) 112. In operation, the system 100 may include computer-readable and computer-executable instructions that reside in storage 1508 on the device 102/server(s) 112. The device 102/server(s) 112 may be an electronic device capable of performing facial recognition and/or speaker recognition. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/server(s) 112 may also be a component of any of the abovementioned devices or systems.

As illustrated in FIG. 15, the device 102/server(s) 112 may include an address/data bus 1502 for conveying data among components of the device 102. Each component within the device 102/server(s) 112 may also be directly connected to other components in addition to (or instead of) being connected to other components across the bus 1502.

The device 102/server(s) 112 may include one or more controllers/processors 1504 comprising one-or-more central processing units (CPUs) for processing data and computer-readable instructions and a memory 1506 for storing data and instructions. The memory 1506 may include volatile random access memory (RAM), non-volatile read only memory (ROM), non-volatile magnetoresistive (MRAM) and/or other types of memory. The device 102/server(s) 112 may also include a data storage component 1508 for storing data and processor-executable instructions. The data storage component 1508 may include one or more non-volatile storage types such as magnetic storage, optical storage, solid-state storage, etc. The device 102/server(s) 112 may also be connected to a removable or external non-volatile memory and/or storage (such as a removable memory card, memory key drive, networked storage, etc.) through the input/output device interfaces 1510.

The device 102/server(s) 112 includes input/output device interfaces 1510. A variety of components may be connected to the device 102/server(s) 112 through the input/output device interfaces 1510, such as camera(s) 104 and microphone(s) 106. However, the disclosure is not limited thereto and the device 102/server(s) 112 may not include an integrated camera or microphone. Thus, the camera(s) 104, microphone(s) 106 and/or other components may be integrated into the device 102 or may be separate without departing from the disclosure.

The input/output device interfaces 1510 may be configured to operate with a network 1520, for example a wireless local area network (WLAN) (such as WiFi), Bluetooth, ZigBee and/or wireless networks, such as a Long Term Evolution (LTE) network, WiMAX network, 3G network, etc. The network 1520 may include a local or private network or may include a wide network such as the internet. Devices may be connected to the network 1520 through either wired or wireless connections.

The input/output device interfaces 1510 may also include an interface for an external peripheral device connection such as universal serial bus (USB), FireWire, Thunderbolt, Ethernet port or other connection protocol that may connect to networks 1520. The input/output device interfaces 1510 may also include a connection to an antenna (not shown) to connect one or more networks 1520 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/server(s) 112 further includes a video module 1524, which may comprise processor-executable instructions stored in storage 1508 to be executed by controller(s)/processor(s) 1504 (e.g., software, firmware), hardware, or some combination thereof. For example, components of the video module 1524 may be part of a software application running in the foreground and/or background on the device 102/server(s) 112. The video module 1524 may control the device 102/server(s) 112 (and in some cases, the image capture device 110) as discussed above, for example with regard to FIGS. 1, 4, 6, 8, 10, and/or 13. Some or all of the controllers/modules of the video module 1524 may be executable instructions that may be embedded in hardware or firmware in addition to, or instead of, software. In one embodiment, the device 102/server(s) 112 may operate using an Android® operating system (such as Android® 4.3 Jelly Bean, Android® 4.4 KitKat or the like) or an Amazon® operating system (such as FireOS or the like).

Executable computer instructions for operating the device 102/server(s) 112 and its various components may be executed by the controller(s)/processor(s) 1504, using the memory 1506 as temporary "working" storage at runtime. The executable instructions may be stored in a non-transitory manner in non-volatile memory 1506, storage 1508, or an external device. Alternatively, some or all of the executable instructions may be embedded in hardware or firmware in addition to or instead of software.

The components of the device(s) 102/server(s) 112, as illustrated in FIG. 15, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 16:
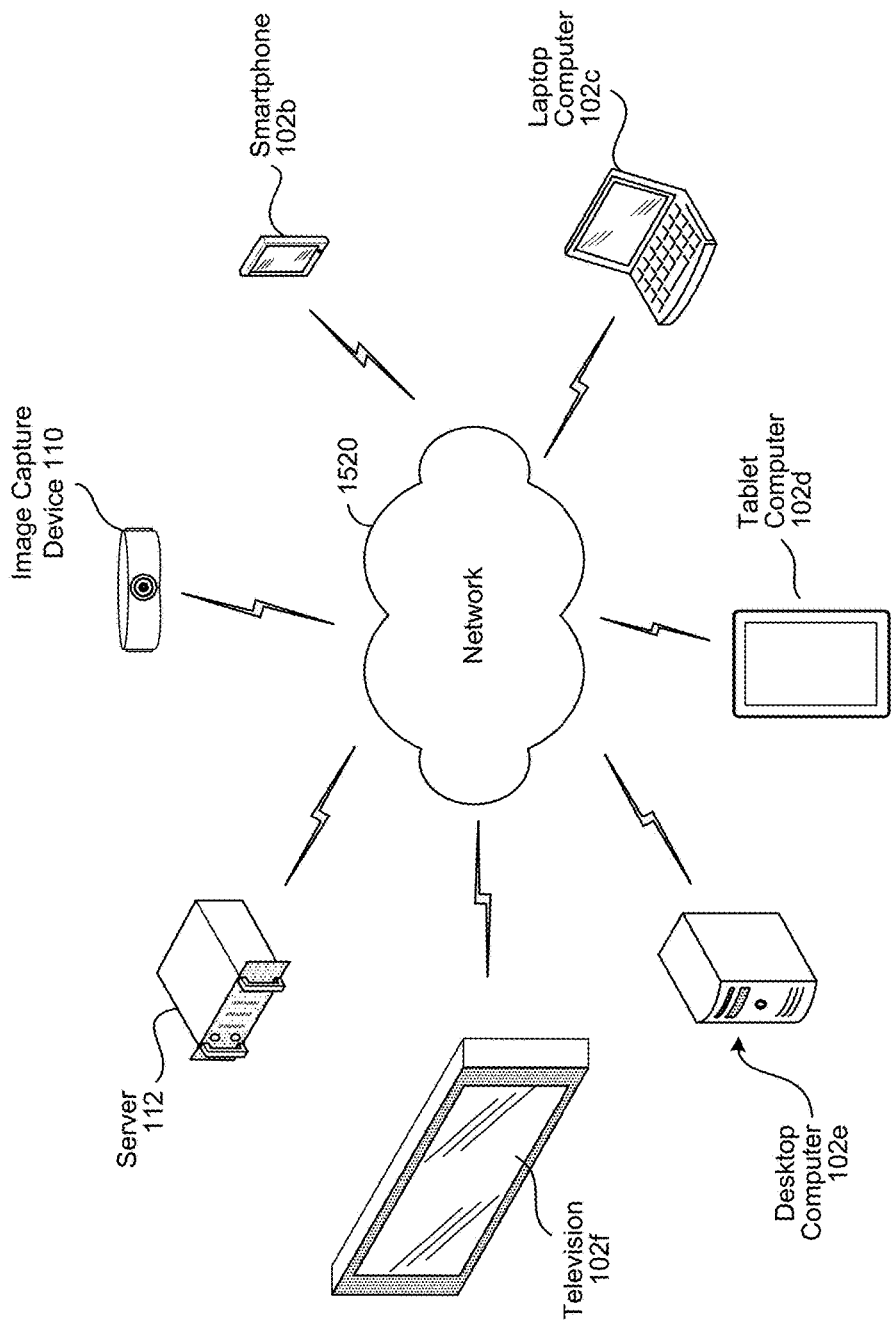
FIG. 16 illustrates an example of a computer network for use with the system.

As shown in FIG. 16, multiple devices may be connected over a network 1520. The network 1520 may include a local or private network or may include a wide network such as the internet. Devices may be connected to the network 1520 through either wired or wireless connections. For example, a smart phone 102*b* may be connected to the network 1520 through a wireless service provider. Other devices, such as an image capture device 110, laptop computer 102*c*, tablet computer 102*d*, desktop computer 102*e*, television 102*f*, and/or server(s) 112, may connect to the network 1520 through a wired connection. The server(s) 112 may be configured to receive, store, process and/or stream data related to image data and/or audio data associated with one or more of the image capture device 110, smartphone 102*b*, laptop computer 102*c*, tablet computer 102*d*, desktop computer 102*e* and television 102*f*, etc. For example, the server(s) 112 may perform any of the steps described above with regard to FIGS. 1, 4, 6, 8, 10, and/or 13. Alternatively, the server(s) 112 may receive and store data generated by the v image capture device 110, smartphone 102*b*, laptop computer 102*c*, tablet computer 102*d*, desktop computer 102*e*, television 102*f*, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first video data captured by a first image capture device at a first location, wherein the first video data has an aspect ratio greater than 2:1;
   receiving second video data captured by a second image capture device at a second location, wherein the second video data has an aspect ratio greater than 2:1;
   detecting a first representation of a first object in the first video data;
   determining that a second representation of the first object is present in the second video data;
   determining, based at least in part on detecting the first representation and determining that the second representation is present in the second video data, a first direction value representing the first location's relative position to the second location;
   determining a first distance between the first location and the second location;
   determining that the first distance is below a threshold;
   determining a beginning timestamp associated with the first video data;
   determining an ending timestamp associated with the first video data;
   determining a first timestamp associated with the second video data;
   determining that the first timestamp is between the beginning timestamp and the ending timestamp;
   determining a first scene represented in the first video data;
   determining a second scene represented in the second video data;
   determining that at least a portion of the second scene corresponds to at least a portion of the first scene;
   associating the second video data with the first video data;
   determining, based on the first direction value and the first distance, a first portion of the first video data;
   determining, based on the first direction value and the first distance, a second portion of the second video data; and
   generating output video data including the first portion and the second portion.

2. The computer-implemented method of claim 1, further comprising:
   determining first pixel coordinates associated with the first object represented in the first video data;
   determining, using the first pixel coordinates, a second direction value from the first location to a third location of the first object;
   determining, using the first pixel coordinates, a first size associated with a representation of the first object in the first video data;
   determining second pixel coordinates associated with the first object represented in the second video data;
   determining, using the second pixel coordinates, a third direction value from the second location to the third location;
   determining, using the second pixel coordinates, a second size associated with a representation of the first object in the second video data;
   determining a second distance between the first location and the third location;
   determining a third distance between the second location and the third location;
   determining the third location of the first object;
   determining, based at least in part on the third location, the first direction value; and
   determining, based at least in part on the third location, the first distance.

3. The computer-implemented method of claim 1, further comprising:
   determining that a second object is represented in the first video data;
   determining a third portion of the first video data that includes a representation of the second object;
   determining a fourth portion of the first video data that does not include the third portion;
   determining a second direction value from the first location to a third location associated with a beginning of the third portion;
   determining a third direction value from the first location to a fourth location associated with an end of the third portion;
   determining, based at least in part on the second direction value and the third direction value, a fifth portion of the second video data corresponding to the third portion; and
   generating the output video data including the fourth portion and the fifth portion, the output video data not including a representation of the second object.

4. The computer-implemented method of claim 1, further comprising:
   determining first pixels associated with a second object in the first video data;
   determining a second direction value from the first location to a third location of the second object;
   determining that the second object is represented in the second video data;

determining a third direction value from the second location to the third location;
determining, based at least in part on the second direction value and the third direction value, a second distance between the first location and the third location;
determining to insert a representation of a third object at a third distance that is greater than the second distance;
determining, based on the second distance, a perspective associated with the third object;
determining, based on the perspective, second pixels representing the third object;
generating third pixels by removing the first pixels from the second pixels; and
inserting the third pixels in the output video data.

5. The computer-implemented method of claim 1, further comprising:
determining a first area associated with the first video data;
determining a second area associated with the second video data;
determining a third area included in both the first area and the second area;
determining a first transition point in the first video data corresponding to the third area;
determining, based on the first transition point, the first portion;
determining a second transition point in the second video data corresponding to the third area;
determining, based on the second transition point, the second portion; and
generating the output video data, wherein the first transition point corresponds to the second transition point and the output video data represents an interior perspective between the first image capture device and the second image capture device.

6. The computer-implemented method of claim 1, further comprising:
receiving third video data captured by a third image capture device at a third location, wherein the third video data has an aspect ratio greater than 2:1;
determining that the third video data is associated with the first video data;
determining a second direction value from the first location to the third location;
determining a second distance between the first location and the third location; and
generating a virtual environment including at least portions of the first video data, the second video data and the third video data.

7. The computer-implemented method of claim 1, wherein
determining a focus point, the focus point corresponding to a third location represented in both the first video data and the second video data;
determining a second direction value from the first location to the third location;
determining a third direction value from the second location to the third location;
determining, using the second direction value, a first transition point corresponding to the focus point in the first video data;
determining, using the third direction value, a second transition point corresponding to the focus point in the second video data; and
generating the output video data, wherein the first transition point in the first video data corresponds to the second transition point in the second video data.

8. A system, comprising:
at least one processor;
at least one memory including instructions that, when executed by the at least one processor, cause the system to:
receive first video data captured by a first image capture device at a first location, wherein the first video data has an aspect ratio greater than 2:1;
receive second video data captured by a second image capture device at a second location, wherein the second video data has an aspect ratio greater than 2:1;
detect a first representation of a first object in the first video data;
determine that a second representation of the first object is present in the second video data;
determine, based at least in part on detecting the first representation and determining that the second representation is present in the second video data, a first direction value representing the first location to the second location;
determine a first distance between the first location and the second location;
determine, based on the first direction value and the first distance, a first portion of the first video data;
determine, based on the first direction value and the first distance, a second portion of the second video data;
determine first pixels associated with a second object in the first video data;
determine a second direction value from the first location to a third location of the second object;
determine that the second object is represented in the second video data;
determine a third direction value from the second location to the third location;
determine, based at least in part on the second direction value and the third direction value, a second distance between the first location and the third location;
determine to insert a representation of a third object at a third distance that is greater than the second distance;
determine, based on the second distance, a perspective associated with the third object;
determine, based on the perspective, second pixels representing the third object;
generate third pixels by removing the first pixels from the second pixels;
generate output video data including the first portion and the second portion; and
insert the third pixels in the output video data.

9. The system of claim 8, wherein the at least one memory further includes instructions that, when executed, further cause the system to:
determine a first geographic location associated with the first video data;
determine a second geographic location associated with the second video data;
determine a fourth distance between the first geographic location and the second geographic location;
determine that the fourth distance is below a threshold;
determine a beginning timestamp associated with the first video data;
determine an ending timestamp associated with the first video data;
determine a first timestamp associated with the second video data;

determine that the first timestamp is between the beginning timestamp and the ending timestamp;
determine a first scene represented in the first video data;
determine a second scene represented in the second video data;
determine that at least a portion of the second scene corresponds to at least a portion of the first scene; and
associate the second video data with the first video data.

10. The system of claim 8, wherein the at least one memory further includes instructions that, when executed, further cause the system to:
determine first pixel coordinates associated with the first object represented in the first video data;
determine, using the first pixel coordinates, a fourth direction value from the first location to a fourth location of the first object;
determine, using the first pixel coordinates, a first size associated with a representation of the first object in the first video data;
determine second pixel coordinates associated with the first object represented in the second video data;
determine, using the second pixel coordinates, a fifth direction value from the second location to the fourth location;
determine, using the second pixel coordinates, a second size associated with a representation of the first object in the second video data;
determine a fourth distance between the first location and the fourth location;
determine a fifth distance between the second location and the fourth location;
determine the fourth location of the first object;
determine, based at least in part on the fourth location, the first direction value; and
determine, based at least in part on the fourth location, the first distance.

11. The system of claim 8, wherein the at least one memory further includes instructions that, when executed, further cause the system to:
determine that a fourth object is represented in the first video data;
determine a third portion of the first video data that includes a representation of the fourth object;
determine a fourth portion of the first video data that does not include the third portion;
determine a fourth direction value from the first location to a fourth location associated with a beginning of the third portion;
determine a fifth direction value from the first location to a fifth location associated with an end of the third portion;
determine, based at least in part on the fourth direction value and the fifth direction value, a fifth portion of the second video data corresponding to the third portion; and
generate the output video data including the fourth portion and the fifth portion, the output video data not including a representation of the fourth object.

12. The system of claim 8, wherein the at least one memory further includes instructions that, when executed, further cause the system to:
determine a first area associated with the first video data;
determine a second area associated with the second video data;
determine a third area included in both the first area and the second area;
determine a first transition point in the first video data corresponding to the third area;
determine, based on the first transition point, the first portion;
determine a second transition point in the second video data corresponding to the third area;
determine, based on the second transition point, the second portion; and
generate the output video data, wherein the first transition point corresponds to the second transition point and the output video data represents an interior perspective between the first image capture device and the second image capture device.

13. The system of claim 8, wherein the at least one memory further includes instructions that, when executed, further cause the system to:
receive third video data captured by a third image capture device at a fourth location, wherein the third video data has an aspect ratio greater than 2:1;
determine that the third video data is associated with the first video data;
determine a fourth direction value from the first location to the fourth location;
determine a fourth distance between the first location and the fourth location; and
generate a virtual environment including at least portions of the first video data, the second video data and the third video data.

14. The system of claim 8, wherein the at least one memory further includes instructions that, when executed, further cause the system to:
determine a focus point, the focus point corresponding to a fourth location represented in both the first video data and the second video data;
determine a fourth direction value from the first location to the fourth location;
determine a fifth direction value from the second location to the fourth location;
determine, using the fourth direction value, a first transition point corresponding to the focus point in the first video data;
determine, using the fifth direction value, a second transition point corresponding to the focus point in the second video data; and
generate the output video data, wherein the first transition point in the first video data corresponds to the second transition point in the second video data.

15. A computer-implemented method, comprising:
receiving first video data captured by a first image capture device at a first location, wherein the first video data has an aspect ratio greater than 2:1;
receiving second video data captured by a second image capture device at a second location, wherein the second video data has an aspect ratio greater than 2:1;
detecting a first representation of a first object in the first video data;
determining that a second representation of the first object is present in the second video data;
determining, based at least in part on detecting the first representation and determining that the second representation is present in the second video data, a first direction value representing the first location's relative position to the second location;
determining a first distance between the first location and the second location;
determining, based on the first direction value and the first distance, a first portion of the first video data;

determining, based on the first direction value and the first distance, a second portion of the second video data;

determining that a second object is represented in the first video data;

determining a third portion of the first video data that includes a representation of the second object;

determining a fourth portion of the first video data that does not include the third portion;

determining a second direction value from the first location to a third location associated with a beginning of the third portion;

determining a third direction value from the first location to a fourth location associated with an end of the third portion;

determining, based at least in part on the second direction value and the third direction value, a fifth portion of the second video data corresponding to the third portion; and generating output video data including the first portion, the second portion, the fourth portion and the fifth portion, the output video data not including a representation of the second object.

16. The computer-implemented method of claim 15, further comprising:

determining a first geographic location associated with the first video data;

determining a second geographic location associated with the second video data;

determining a fourth distance between the first geographic location and the second geographic location;

determining that the fourth distance is below a threshold;

determining a beginning timestamp associated with the first video data;

determining an ending timestamp associated with the first video data;

determining a first timestamp associated with the second video data;

determining that the first timestamp is between the beginning timestamp and the ending timestamp;

determining a first scene represented in the first video data;

determining a second scene represented in the second video data;

determining that at least a portion of the second scene corresponds to at least a portion of the first scene; and associating the second video data with the first video data.

17. The computer-implemented method of claim 15, further comprising:

determining first pixels associated with a third object in the first video data;

determining a fourth direction value from the first location to a fifth location of the third object;

determining that the third object is represented in the second video data;

determining a fifth direction value from the second location to the fifth location;

determining, based at least in part on the fourth direction value and the fifth direction value, a third distance between the first location and the fifth location;

determining to insert a representation of a fourth object at a fourth distance that is greater than the third distance;

determining, based on the third distance, a perspective associated with the fourth object;

determining, based on the perspective, second pixels representing the fourth object;

generating third pixels by removing the first pixels from the second pixels; and inserting the third pixels in the output video data.

18. The computer-implemented method of claim 15, further comprising:

determining a first area associated with the first video data;

determining a second area associated with the second video data;

determining a third area included in both the first area and the second area;

determining a first transition point in the first video data corresponding to the third area;

determining, based on the first transition point, the first portion;

determining a second transition point in the second video data corresponding to the third area;

determining, based on the second transition point, the second portion; and generating the output video data, wherein the first transition point corresponds to the second transition point and the output video data represents an interior perspective between the first image capture device and the second image capture device.

19. The computer-implemented method of claim 15, further comprising:

receiving third video data captured by a third image capture device at a fifth location, wherein the third video data has an aspect ratio greater than 2:1;

determining that the third video data is associated with the first video data;

determining a fourth direction value from the first location to the fifth location;

determining a second distance between the first location and the fifth location; and generating a virtual environment including at least portions of the first video data, the second video data and the third video data.

20. The computer-implemented method of claim 15, further comprising:

determining a focus point, the focus point corresponding to a fifth location represented in both the first video data and the second video data;

determining a fourth direction value from the first location to the fifth location;

determining a fifth direction value from the second location to the fifth location;

determining, using the fourth direction value, a first transition point corresponding to the focus point in the first video data;

determining, using the fifth direction value, a second transition point corresponding to the focus point in the second video data; and generating the output video data, wherein the first transition point in the first video data corresponds to the second transition point in the second video data.

* * * * *